(12) United States Patent
Ohtsuki et al.

(10) Patent No.: US 7,452,133 B2
(45) Date of Patent: Nov. 18, 2008

(54) SENSOR-INTEGRATED WHEEL SUPPORT BEARING ASSEMBLY

(75) Inventors: Hisashi Ohtsuki, Shizuoka (JP); Hideo Shinagawa, Shizuoka (JP); Kenichi Iwamoto, Shizuoka (JP); Koichi Okada, Shizuoka (JP)

(73) Assignee: NTN Corporation, Osaka (JP)

( * ) Notice: Subject to any disclaimer, the term of this patent is extended or adjusted under 35 U.S.C. 154(b) by 361 days.

(21) Appl. No.: 10/555,733

(22) PCT Filed: Apr. 30, 2004

(86) PCT No.: PCT/JP2004/006358

§ 371 (c)(1),
(2), (4) Date: Nov. 7, 2005

(87) PCT Pub. No.: WO2004/099747

PCT Pub. Date: Nov. 18, 2004

(65) Prior Publication Data

US 2007/0110350 A1    May 17, 2007

(30) Foreign Application Priority Data

May 6, 2003   (JP)   ............................. 2003-127810
May 7, 2003   (JP)   ............................. 2003-128554

(51) Int. Cl.
*F16C 41/04*   (2006.01)
*F16C 32/04*   (2006.01)
*G01P 3/42*    (2006.01)

(52) U.S. Cl. ...................................... 384/448; 324/174

(58) Field of Classification Search ......... 384/446–448, 384/544–545, 484, 488, 477; 73/95, 118.1; 301/111; 310/90, 90.5, 45; 277/317; 324/207.5, 324/207.25, 173–174
See application file for complete search history.

(56) References Cited

U.S. PATENT DOCUMENTS 5,127,747 A * 7/1992 Hilby et al. ................. 384/448

(Continued)

FOREIGN PATENT DOCUMENTS

JP    60-95538    6/1985

(Continued)

OTHER PUBLICATIONS

International Search Report for PCT/JP2004/006358 (3 pages); dated Aug. 31, 2004.

(Continued)

*Primary Examiner*—Marcus Charles
(74) *Attorney, Agent, or Firm*—Osha • Liang LLP

(57) ABSTRACT

A sensor-integrated wheel support bearing assembly for rotatably supporting a vehicle wheel relative to a vehicle body structure has an outer member having an inner peripheral surface formed with a plurality of raceway surfaces, an inner member having an outer peripheral surface formed with raceway surfaces in alignment with the raceway surfaces in the outer member, a plurality of rows of rolling elements interposed between the raceway surfaces in the outer member and the raceway surfaces in the inner member, respectively, and a load sensor. The load sensor is disposed in one of the outer and inner members, which forms a stationary member. The outer member has an outer periphery formed with a vehicle body fitting flange. The load sensor for detecting a load acting on the vehicle wheel by detection of a load acting on the vehicle body fitting flange is disposed in the vehicle body fitting flange.

16 Claims, 16 Drawing Sheets

U.S. PATENT DOCUMENTS

| | | | |
|---|---|---|---|
| 5,309,094 A * | 5/1994 | Rigaux et al. | 324/174 |
| 5,343,759 A | 9/1994 | Hesthamar et al. | |
| 6,802,208 B2 * | 10/2004 | Chinitz et al. | 73/118.1 |
| 2002/0092360 A1 * | 7/2002 | McDearmon | 73/795 |
| 2003/0115977 A1 * | 6/2003 | Holweg et al. | 73/865.9 |
| 2003/0202723 A1 * | 10/2003 | Tajima et al. | 384/448 |
| 2004/0170344 A1 * | 9/2004 | Tajima et al. | 384/448 |

FOREIGN PATENT DOCUMENTS

| | | | |
|---|---|---|---|
| JP | 05231967 A * | 9/1993 | |
| JP | 09-228007 A * | 9/1997 | |
| JP | 11037830 A * | 2/1999 | |
| JP | 2944315 | 9/1999 | |
| JP | 2001-33322 | 2/2001 | |
| JP | 2002-206557 A * | 7/2002 | |
| JP | 2002193083 A * | 7/2002 | |
| JP | 2002-340922 | 11/2002 | |
| JP | 2002-357493 | 12/2002 | |
| JP | 2003-83350 A * | 3/2003 | |
| JP | 2003-120701 | 4/2003 | |
| JP | 2003-207402 | 7/2003 | |
| JP | 2004-127276 | 4/2004 | |
| JP | 2004-127276 A * | 4/2004 | |
| JP | 2004-155261 | 6/2004 | |

OTHER PUBLICATIONS

Patent Abstracts of Japan 2003-120701 (2 pages); dated Apr. 23, 2004.
Patent Abstracts of Japan 05-187932 (2 pages); dated Jul. 27, 1993.
Patent Abstracts of Japan 2002-357493 (2 pages); dated Dec. 13, 2002.
Patent Abstracts of Japan 2004-155261 (2 pages); dated Jun. 3, 2004.
Patent Abstracts of Japan 2004-127276 (2 pages); dated Apr. 22, 2004.
Patent Abstracts of Japan 2003-207402 (2 pages); dated Jul. 25, 2003.
Patent Abstracts of Japan 2002-340922 (2 pages); dated Nov. 27, 2002.
Patent Abstracts of Japan 2001-033322 (2 pages); dated Feb. 9, 2001.

* cited by examiner

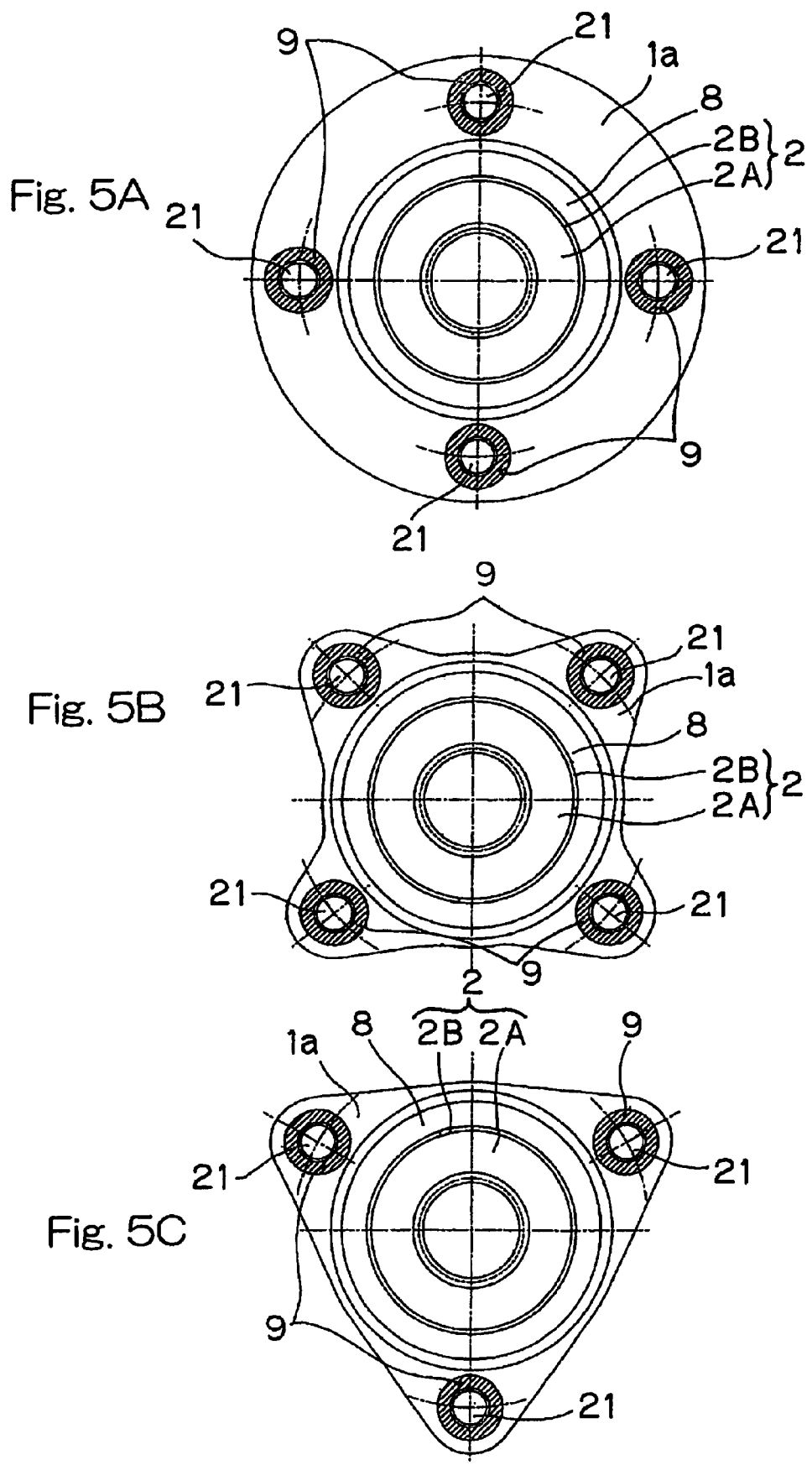

SENSOR-INTEGRATED WHEEL SUPPORT BEARING ASSEMBLY

BACKGROUND ART

The present invention relates to a wheel support bearing assembly equipped with at least one of a load sensor for detecting a load imposed on a bearing portion of a vehicle wheel and a torque sensor for detecting a torque acting on a shaft or axle.

Hitherto, in order to accomplish a control of an anti-lock braking system of an automotive vehicle and a control of the attitude assumed by the automotive vehicle during travel thereof, the wheel support bearing assembly has been well known, in which sensors are incorporated therein. Specifically, the wheel support bearing assembly has been suggested, in which the various sensors such as a temperature sensor and a vibration sensor are employed to detect, in addition to the number of revolutions (the rotational speed), various parameters useful for the travel of the automotive vehicle. (See, for example, the Japanese Laid-open Patent Publication No. 2002-340922.)

On the other hand, the wheel support bearing assembly is also known, in which for controlling the attitude of the automotive vehicle during the travel thereof, sensors for detecting the rotational speeds of wheels employed in the automotive vehicles. Also, in the general purpose wheel support bearing assemblies currently widely in use, a bearing assembly is furthermore known in which a torque sensor including magnetostrictive patterns, provided on an outer peripheral surface of an inner race, and a coil carried by an outer race is incorporated. (See, for example, the Japanese Laid-open Patent Publication No. 2001-33322.)

The control of the attitude of the automotive vehicle during the run thereof is difficult to achieve only with detection of the rotational speed of the automotive vehicle. In view of this, it is contemplated to achieve the attitude control in dependence on the load acting on the wheels of the automotive vehicle during the run thereof. By way of example, during the cornering, a relatively large load acts on the vehicle wheels on one side; during the travel on a non-leveled road surface, a relatively large load acts on the wheels on one side of the automotive vehicle; and during the braking, a relatively large load acts on the front wheels. Thus, the loads acting on the vehicle wheels are not even. Also, in the case that the vehicle carries unevenly-distributed load, the loads acting on the vehicle wheels may be uneven. For this reason, if the loads acting on the vehicle wheels can be detected at any time, the automobile suspension system or the like can be controlled based on the result of detection to accomplish the vehicle attitude control (prevention of the rolling of the automotive vehicle during the cornering, prevention of the front wheel sag during the braking, and/or prevention of the automotive body sinking or lowering brought about by uneven distribution of load). However, no suitable space for installation of those sensors for detecting the loads acting on the vehicle wheels is available and, therefore, the vehicle attitude control relying on the detection of the loads is difficult to realize.

On the other hand, even with the vehicle attitude control that is carried out by comparing the respective rotational speeds of the vehicle wheels, the proper vehicle attitude control is difficult. In order to accomplish the proper vehicle attitude control, an increased number of pieces of information on the operating condition of an automotive vehicle, or information that accurately reflects a change in attitude during the run of the automotive vehicle is required to be detected. However, in order to detect the operating condition information on various portions of the automotive vehicle, various sensors are necessary. Incorporation of sensors has problems with the space for installation thereof, installation work, wiring and so on. Considering that the automotive vehicle in general is strongly required to be mass-producible and lightweight, the demands therefor must be satisfied. Because of that, such problems have been encountered with as to what type of sensor should be selected for securing the information on the operating condition of the automotive vehicle and where such sensor should be installed, as a sensor to be added for the purpose of accomplishing the proper vehicle attitude control while the foregoing demands have been satisfied.

SUMMARY OF THE INVENTION

The present invention has been made with a view to substantially eliminating the problems and inconveniences such as discussed above and is intended to provide a sensor-integrated wheel support bearing assembly, which allows a load sensor or a torque sensor to be compactly installed in an automotive vehicle and which has a capability of detecting the load or torque acting on a vehicle wheel.

In order to accomplish the foregoing object of the present invention, there is provided a sensor-integrated wheel support bearing assembly for rotatably supporting a vehicle wheel relative to a vehicle body structure, which assembly comprises an outer member having an inner peripheral surface formed with a plurality of raceway surfaces; an inner member having an outer peripheral surface formed with raceway surfaces in alignment with the raceway surfaces in the outer member; a plurality of rows of rolling elements interposed between the raceway surfaces in the outer member and the raceway surfaces in the inner member, respectively; and at least one of a load sensor and a torque sensor. The load sensor is disposed in one of the outer and inner members, which forms a stationary member. The torque sensor includes a to-be-detected element disposed in one of the outer and inner members, which forms a rotatable member, and made of a magnetostrictive material, and a torque detecting element provided in the other of the outer and inner members, which forms a stationary member, for detecting a change in magnetic characteristic of the to-be-detected element to detect a working torque.

According to the wheel support bearing assembly equipped with the load sensor, the load acting on the vehicle wheel is detected by the load sensor mounted on one of the outer member and the inner member, which forms a stationary member. When a change in output from the load sensor is utilized as information to control the automobile suspension system, the attitude assumed by the automotive vehicle during the run thereof can be controlled. Since the load sensor is installed in the wheel support bearing assembly, the load sensor can be compactly installed in the automotive vehicle.

Also, according to the wheel support bearing assembly equipped with the torque sensor, when the torque acts on the rotatable member, a torsion occurs in the rotatable member, resulting in distortion in the to-be-detected element. The to-be-detected element made of a magnetostrictive material has a magnetic characteristic that varies in response to the distortion, and a change in magnetic characteristic thereof can be detected by the torque detecting element. Accordingly, a torque working on the rotatable member can be detected. The torque so detected in the wheel support bearing assembly used for each of the vehicle wheels is received in a vehicle attitude control device, and can be used as a piece of information indicative of change in attitude of the automotive vehicle. The drive system of the automotive vehicle is then controlled in reference to that piece of information, controlling the vehicle attitude assumed during the run of the automotive vehicle. Since the torque sensor including the to-be-detected element and the torque detecting element is built in the wheel support bearing assembly, a dedicated space for installation of the torque sensor is not required and the torque sensor can be compactly installed in the automotive vehicle. Also, since the wheel support bearing assembly is equipped with the torque sensor, a torque sensor is not necessary to be installed at any other locations of the vehicle body structure, with no extra mounting work required and excellent handling capability obtained.

Where the rotatable member is the inner member, for example, the to-be-detected element made of the magnetostrictive material is formed on an outer periphery of the inner member and, on the other hand, the torque detecting element for detecting a working torque on a shaft or axle, which is coupled with the inner member, by detection of a change in magnetic characteristic of the to-be-detected element is provided in the outer member. In the case of this structure, when the torque acts on the shaft or axle coupled with the inner member, distortion occurs in the to-be-detected element as a result of the torsion induced in the inner member. The to-be-detected element made of the magnetostrictive material has its magnetic characteristic varying in response to the distortion and the change in magnetic characteristic is detected by the torque detecting element. Because of this, the torque acting on the shaft or axle can be detected.

In the present invention, the load sensor may utilize a magnetostrictive element or a piezoelectric element as a load detecting element having an electrical characteristic variable in dependence on the load. If the magnetostrictive element or the piezoelectric element is used, the load acting on a vehicle body fitting flange can easily be detected in reference to the distortion of the vehicle body fitting flange.

In the present invention, the outer member has an outer periphery which may be formed with a vehicle body fitting flange having a bolt insertion hole such that the load sensor for detecting a load acting on the vehicle wheel by detection of a load acting on the vehicle body fitting flange may be disposed in the bolt insertion hole. In the case of this construction, the load acting on the vehicle body fitting flange of the outer member can be detected by the load sensor. The vehicle body fitting flange quickly reflects a change in load acting on the vehicle wheel and the change in load imposed on the vehicle wheel can be correspondingly quickly detected by the load sensor. Accordingly, if information on the change in output from the load sensor is used in controlling the automobile suspension system or the like, the attitude assumed by the automotive vehicle during the run thereof can be controlled. Since the load sensor is disposed in the bolt insertion hole defined in the vehicle body fitting flange, no space is required outside the wheel support bearing assembly for the installation of the load sensor and, therefore, the load sensor can be compactly installed in the automotive vehicle.

Where the load sensor is disposed in the bolt insertion hole defined in the vehicle body fitting flange, the load sensor may include a load detecting element having an electrical characteristic variable in dependence on the load, which load detecting element may be provided in a bolt that is inserted into the bolt insertion hole.

The load acting on the bolt used to secure the vehicle body fitting flange varies in dependence on the load acting on the vehicle body fitting flange. Because of this, positioning of the load detecting element in the bolt is effective to detect the load acting on the wheel body fitting flange. Where the load detecting element is disposed in the bolt, any machining for the installation of the load detecting element in the vehicle body fitting flange is no longer necessary and the structure of the sensor-integrated wheel support bearing assembly can advantageously be simplified.

Where the load sensor is disposed in the bolt insertion hole, the single load sensor may be employed and a processing unit for detecting a magnitude of the load in reference to a detection signal outputted from the load sensor may be employed in combination with the load sensor. Also, a plurality of the load sensors may be installed respectively in a plurality of the bolt insertion holes defined in the vehicle body fitting flange, and in combination therewith, a processing unit for detecting a magnitude of the load and a direction of the load in reference to detection signals outputted respectively from the plural load sensors.

In the event that the plural load sensors are provided, not only the magnitude of the load, but also the direction of the load, for example, the direction of bending can be detected in reference to the difference in detected values outputted from the load sensors.

In the present invention, the load sensor may be so disposed as to allow the load detecting element to receive an initial preload. The load to be detected by the load detecting element and the output generated from the load detecting element do not necessarily show a linear relationship and it is quite general that the output change relative to the working load stabilizes within the range of the load of a certain magnitude. For this reason, positioning of the load sensor such as to allow the load detecting element to receive the initial preload is effective to allow the load sensor to be utilized in an operating region in which input and output characteristics of the load sensor are stabilized, making it possible to achieve an accurate detection of the load. Also, application of the initial preload is also effective to enable the detection of the load in both of positive and negative directions.

In the present invention, a transmitter for transmitting wireless a detected load signal outputted from the load sensor may be employed. The use of the transmitter eliminates wiring between a control device on the vehicle body structure for receiving the detected load signal and the load sensor, allowing the load sensor to be compactly installed.

In the present invention, the magnetostrictive material of the to-be-detected element may be an alloy of iron and aluminum and the torque detecting element may be a coil provided on the outer member so as to encircle the to-be-detected element. The magnetostrictive material made of an alloy of iron and aluminum has a magnetostrictive characteristic in which the magnetic permeability changes considerably in response to the torque and, therefore, is effective to accomplish the torque detection with high sensitivity. Also, the magnetostrictive material can easily be manufactured.

In the present invention, the to-be-detected element may be positioned intermediate between the raceway surfaces. In the case of this construction, a portion between the raceway surfaces of each of the inner and outer members can be efficiently utilized to accommodate the to-be-detected element and the torque detecting element and, therefore, the torque sensor can be compactly accommodated within the wheel support bearing assembly.

In the present invention, the inner member may be a rotatable member and may include an outer race of a constant velocity universal joint, in which case the to-be-detected element is provided on an outer periphery of the outer race of the constant velocity universal joint.

In the drive wheel, the constant velocity universal joint is generally utilized for the drive transmission to the wheel support bearing and has an outer race utilized as the inner member of the wheel support bearing assembly. Positioning of the to-be-detected element on the outer periphery of the outer race of the constant velocity universal joint is effective to obtain a relatively large space for the installation of the to-be-detected element and the torque detecting element in face-to-face relation with the to-be-detected element. For this reason, the torque sensor can be compactly installed in the automobile vehicle.

In the present invention, the to-be-detected element may include a hollow cylindrical body made of a magnetostrictive material and having a plurality of inclined grooves defined therein in a circular row in a direction circumferentially of the cylindrical body, which grooves are inclined relative to an axial direction of the bearing assembly. Where the grooves are arranged on the cylindrical body to be inclined relative to the axial direction, a tensile stress or a compressive stress is developed in the inclined grooves when the torque acts on the shaft or axle, so that the change of the magnetic permeability of the to-be-detected element can be enhanced consequently. Accordingly, the torque detection is possible with a high sensitivity. Also, since the cylindrical body is employed as a member separate from the inner member and the inclined grooves are formed in the cylindrical body, as compared with a magnetostrictive pattern formed directly in the inner member, any thermal influence brought about during formation of the magnetostrictive pattern in the inner member need not be taken into consideration and the manufacture can be simplified.

In the present invention, the inclined grooves may be formed in two circular rows extending in the direction circumferentially of the cylindrical body, with the inclination directions of the grooves of the two circular rows being opposite to each other. In the case of this construction, when the torque acts on the shaft or axle, the tensile stress is developed in one of the rows of the inclined grooves, causing the compressive stress to be developed in the other of the rows of the inclined grooves. Accordingly, when the difference between respective detected values outputted from coils, which form the torque detecting elements, associated with the corresponding rows of the inclined grooves is outputted as a detection signal indicative of the change in torque, the polarity (positive or negative) and the magnitude of the output can be determined and the direction and the magnitude of the torsional torque acting on the shaft or axle can be determined.

Where the inclined grooves are formed in the cylindrical body made of the magnetostrictive material, the depth of each of the inclined grooves is preferably 0.1 mm or greater. In order to obtain sufficient sensitivity, the depth of the inclined grooves is preferably 0.1 mm or greater.

In the present invention, a transmitter may be provided for transmitting wireless a detection signal fed from the torque detecting element. Where the wireless transmitter is employed, wiring between the torque sensor and the control device on the vehicle body structure for receiving the detected torque signal can be dispensed with, allowing the torque sensor to be compactly installed.

In the present invention, at least one of a rotation detecting sensor for detecting a rotational speed of the inner member, a load sensor for detecting a load acting on the inner member and a temperature sensor for detecting a temperature of the wheel support bearing assembly may be provided in the wheel support bearing assembly. This permits not only the torque acting on the shaft or axle, but also the rotational speed, the load and/or the temperature to be detected from the wheel support bearing assembly and, therefore, a high level vehicle attitude control or transmission of an abnormality warning can be achieved. Since those plural functionalities are provided in the single bearing assembly, a plurality of types of sensors require no individual spaces outside the bearing assembly for installation and the installing work can be simplified.

BRIEF DESCRIPTION OF THE DRAWINGS

FIGS. 5A to 5C are front elevational view showing different configurations of a vehicle body fitting flange formed in an outer member of the wheel support bearing assembly, on which the load sensor is mounted;

DETAILED DESCRIPTION OF THE EMBODIMENTS

Figure 1:
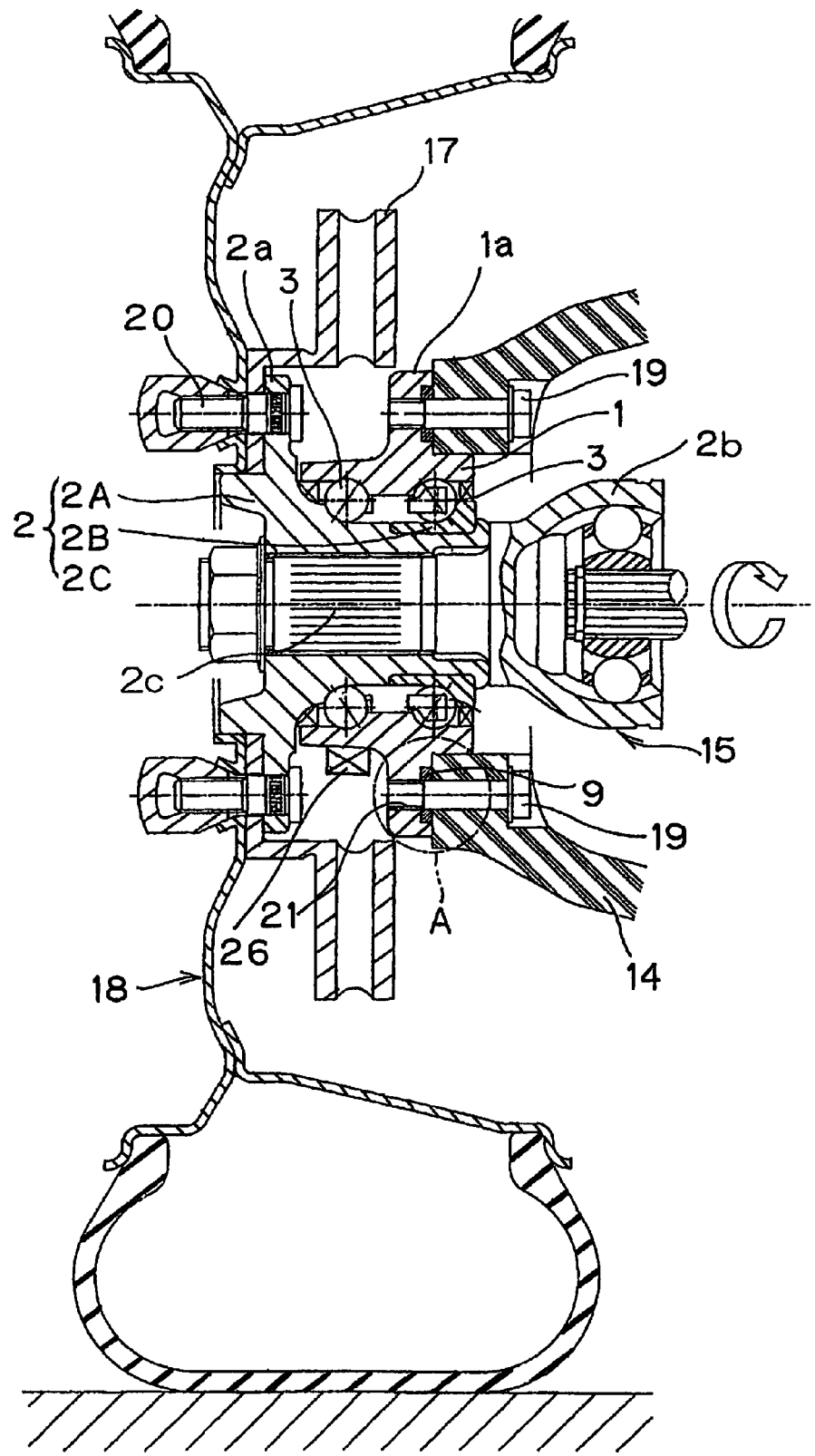
FIG. 1 is a longitudinal sectional view of a sensor-integrated wheel support bearing assembly according to a first preferred embodiment of the present invention, showing a support structure for supporting a vehicle drive wheel.

In the first place, first to eighth preferred embodiments of the present invention will be individually described in connection with a sensor-integrated wheel support bearing assembly equipped with a load sensor capable of detecting a load imposed on a vehicle wheel.

The first preferred embodiment of the present invention will now be described with reference to FIGS. 1 to 6C. This first embodiment is directed to a third generation type wheel support bearing assembly of an inner race rotating model that is used to rotatably support a vehicle drive wheel. Referring to FIG. 2, this wheel support bearing assembly includes an outer member 1 having an inner peripheral surface formed with a plurality of raceway surfaces 4, an inner member 2 having raceway surfaces 5 aligned respectively with the raceway surfaces 4, a plurality of rows of rolling elements 3 interposed between the raceway surfaces 4 and the raceway surfaces 5, respectively. The illustrated wheel support bearing assembly is in the form of an angular ball bearing. The raceway surfaces 4 and 5 represent an arcuate sectional shape and have respective angles of contact so defined as to achieve a back-to-back alignment. The rolling elements 3 are in the form of a ball and are rollingly retained by a retainer 6 for each row of the rolling elements 3.

Figure 2:
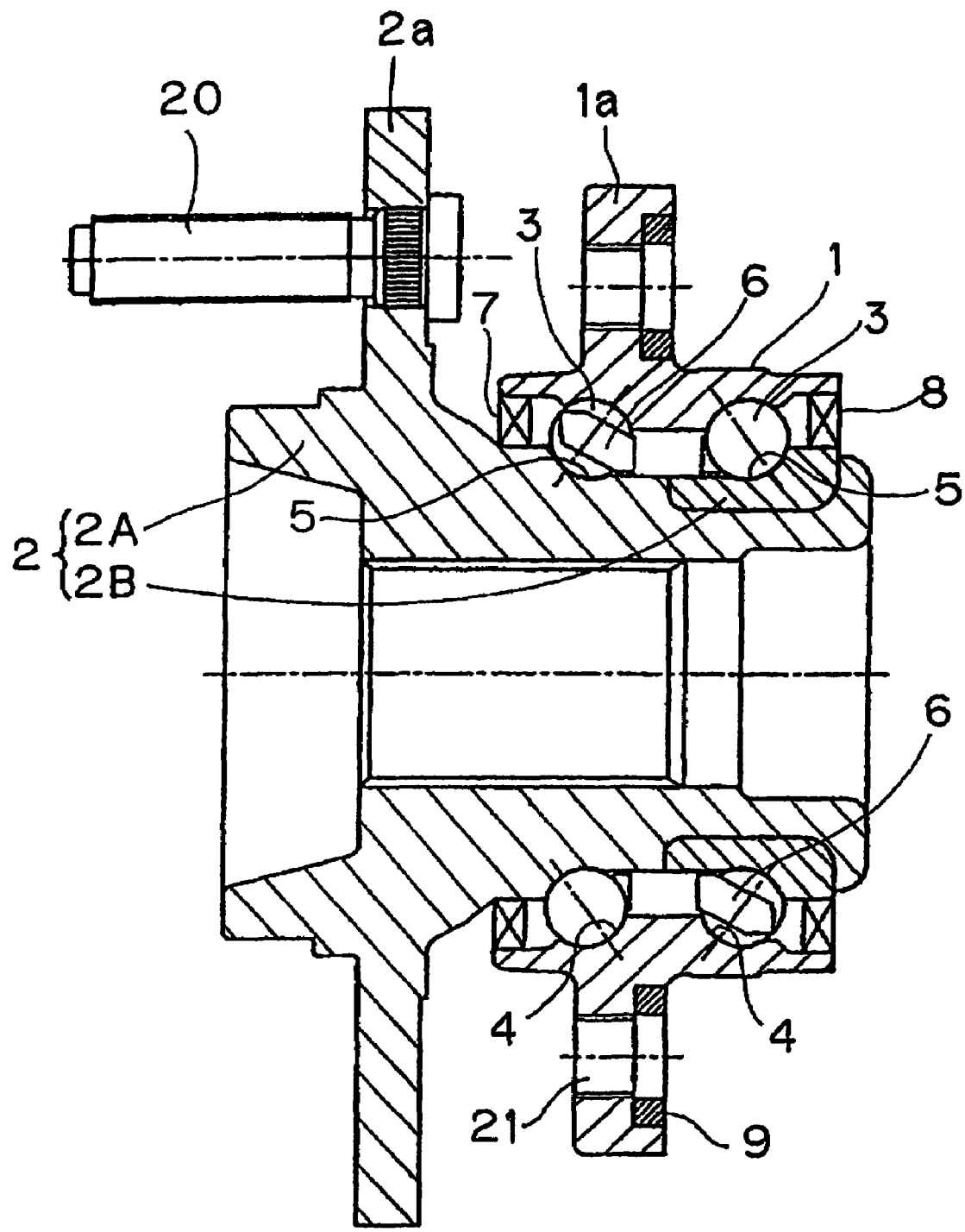
FIG. 2 is a longitudinal sectional view of the sensor-integrated wheel support bearing assembly shown in FIG. 1.

The outer member 1 forms a stationary member and is of one-piece construction having an outer periphery formed with a vehicle body fitting flange 1a through which the wheel support bearing assembly is secured to a knuckle 14 as shown in FIG. 1. The vehicle body fitting flange 1a is fixedly fastened to the knuckle 14, mounted on a vehicle body structure (not shown), through a plurality of circumferentially spaced bolts 19. Bolt insertion holes 21 defined in the wheel mounting flange 1a are internally helically threaded so that the bolts 19 can, after having passed through corresponding throughholes defined in the knuckle 14, be threaded firmly into those bolt insertion holes 21. It is to be noted that instead of the bolt insertion holes 21 internally threaded, they may be merely throughholes through which the bolts 16 can be passed, so that the bolts 16 can be fastened with respective nuts (not shown).

The inner member 2 forms a rotatable member and includes a hub axle 2A having a wheel mounting flange 2a formed therein, an inner race forming member 2B, which is a member separate from the hub axle 2A and is mounted externally on an inboard end of the hub axle 2A, and an outer race 2C of a constant velocity universal joint 15. The hub axle 2A and the inner race forming member 2B are formed with the respective raceway surfaces 5 for respective rows of the rolling elements 3.

The outer race 2C of the constant velocity universal joint 15 is a member of one-piece construction including a cup portion 2b and a stem portion 2c. The stem portion 2c is inserted through an axial bore of the hub axle 2A with a nut threadingly fastened to a free or outboard end of the stem portion 2c to firmly connect the outer race 2C with the hub axle 2A for rotation together therewith.

An inner peripheral surface of the hub axle 2A defining the axial bore is formed with axially extending splined grooves and is hence splined to the stem portion 2c. The wheel mounting flange 2a is positioned at an outboard end of the inner member 2 and, as shown in FIG. 1, a plurality of bolts 20 passed through a vehicle wheel 18 are fastened to the wheel mounting flange 2a through a brake rotor 17. The inner race forming member 2B is axially fastened to the hub axle 2A by staking an inboard edge portion of the hub axle 2A. An annular bearing space delimited between the inner and outer members 2 and 1 has opposite, annular outboard and inboard open ends that are sealed by contact-type sealing members 7 and 8, respectively.

Figure 3:
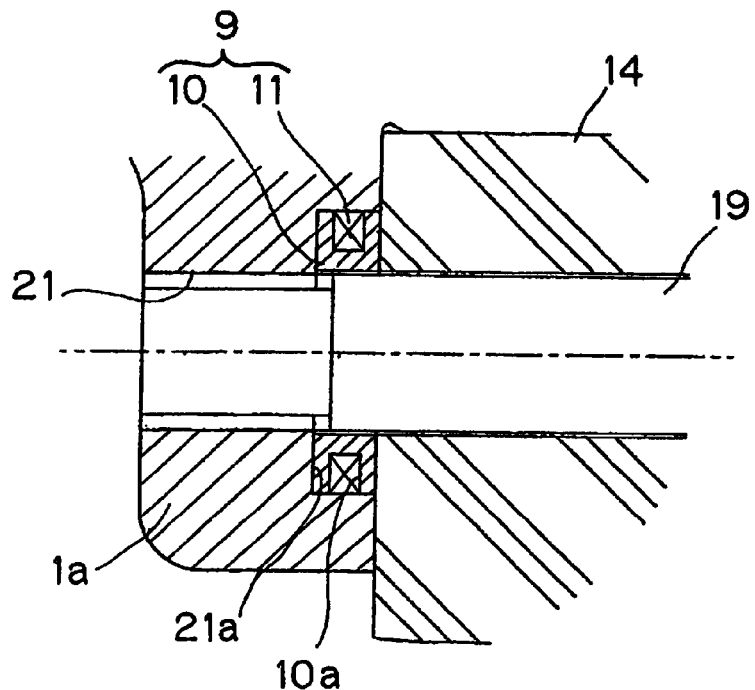
FIG. 3 is a fragmentary longitudinal sectional view of an essential portion of the sensor-integrated wheel support bearing assembly, showing on an enlarged scale a load sensor mounting structure for supporting a load sensor shown by a portion A.

A load sensor 9 for detecting the load acting on the vehicle body fitting flange 1a is provided in the bolt insertion holes 21 defined in the vehicle body fitting flange 1a. Mounting of the load sensor 9 (shown by A in FIG. 1) is shown in FIG. 3 on an enlarged scale. The load sensor 9 is formed in a ring shape and is disposed in a counterbore 21a formed in an open end edge of the bolt insertion hole 21. This load sensor 9 is made up of a magnetostrictive element 10, which is a load detecting element having its electric characteristic varying in proportion to the applied load, and a coil 11 which is a detector having its inductance varying with change of the electric characteristic such as magnetic permeability of the magnetostrictive element 10. The coil 11 is provided in a processing circuit 12 (shown in FIG. 6) utilizing the coil 11 as one of its circuit component parts. The magnetostrictive element 10 is formed in a ring shape having its outer periphery formed with a circumferentially extending groove 10a, and the coil 11 is accommodated within this circumferentially extending groove 10a.

The magnetostrictive element 10 is so disposed as to receive an initial preload. By way of example, the relation between the depth of the counterbore 21a and the thickness of the magnetostrictive element 10 is so chosen that a compressive load or an initial load can act on the magnetostrictive element 10 between an axially facing surface of the knuckle 14 and an annular bottom face of the counterbore 21a by fastening the corresponding bolt 19 properly. With the load sensor 9 disposed in such a manner as to permit the initial preload to be imposed on the magnetostrictive element 10 which is the load detecting element, the load sensor 9 can be used in an operating region, in which input and output characteristics thereof are stabilized, making it possible to achieve an accurate load detection. Loads in positive and negative directions can also be detected.

Figure 4:
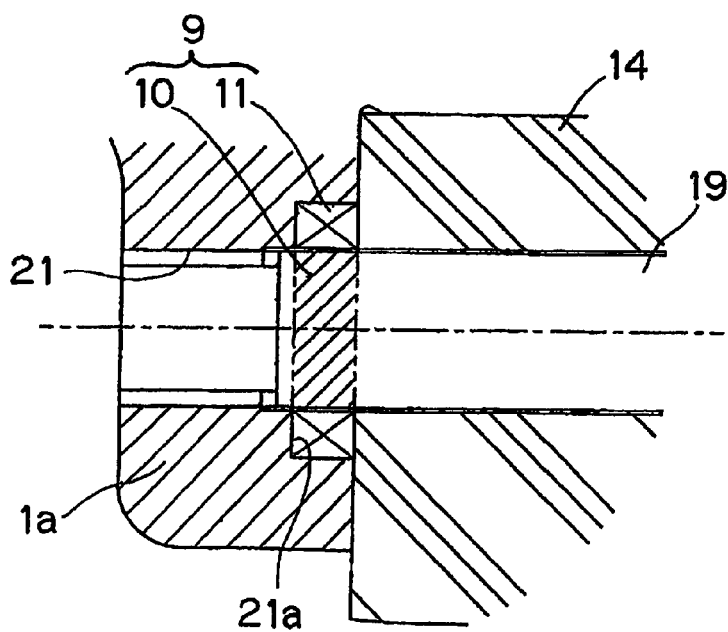
FIG. 4 is an enlarged longitudinal sectional view of a modified form of the load sensor mounting structure.

It is to be noted that for the load detecting element, a piezoelectric element may be equally employed other than the magnetostrictive element. In such case, the piezoelectric element concurrently serves as a load detecting element and also as a detector. It is also to be noted that as a modification, the load sensor 9 may be of a design in which the magnetostrictive element 10 is provided in the bolt 19 and the coil 11 is positioned around such bolt 19 as shown in FIG. 4. The coil 11 is accommodated within the counterbore 21a in the bolt insertion hole 21. The magnetostrictive element 10 is formed by spray coating a magnetostrictive material on, for example, a surface layer portion of the bolt 19.

FIG. 5A illustrates a front elevational view of the vehicle body fitting flange 1a. This vehicle body fitting flange 1a is formed in an annular shape on the outer periphery of the outer member 1 so as to extend radially outwardly, with the bolt insertion holes 21 defined therein in a circumferential direction of the fitting flange 1a. In the example shown in FIG. 5A, the four bolt insertion holes 21 are formed and equidistantly spaced in the circumferential direction of the vehicle body fitting flange 1a, with the load sensor 9 employed for each of the bolt insertion holes 21.

In FIGS. 5A to 5C, the load sensor 9 is shown by hatching for clarification purpose. Other than the vehicle body fitting flange 1a of the annular shape, the vehicle body fitting flange 1a may be made up of a plurality of protrusions extending radially outwardly from the outer periphery of the outer member 2 such as shown in any of FIGS. 5B and 5C. Specifically, the vehicle body fitting flange 1a shown in FIG. 5B is made up of four radially outwardly extending protrusions each formed with the respective bolt insertion hole 21, and the load sensor 9 is disposed in each of those bolt insertion holes 21. The vehicle body fitting flange 1a shown in FIG. 5C is made up of three radially outwardly extending protrusions each formed with the respective bolt insertion hole 21, and the load sensor 9 is disposed in each of those bolt insertion holes 21.

It is to be noted that although in the foregoing description the load sensor 9 has been shown and described as disposed in each of the bolt insertion holes 21, the load sensor 9 may be selectively disposed in some of the bolt insertion holes 21 or may be disposed in only one of the bolt insertion holes 21. It is also to be noted that the vehicle body fitting flange 1a may be in the form of the annular shape as shown in FIG. 5A or protrusion shape as shown in FIGS. 5B and 5C, regardless of the number of the bolt insertion holes 21 employed.

Figure 6A:
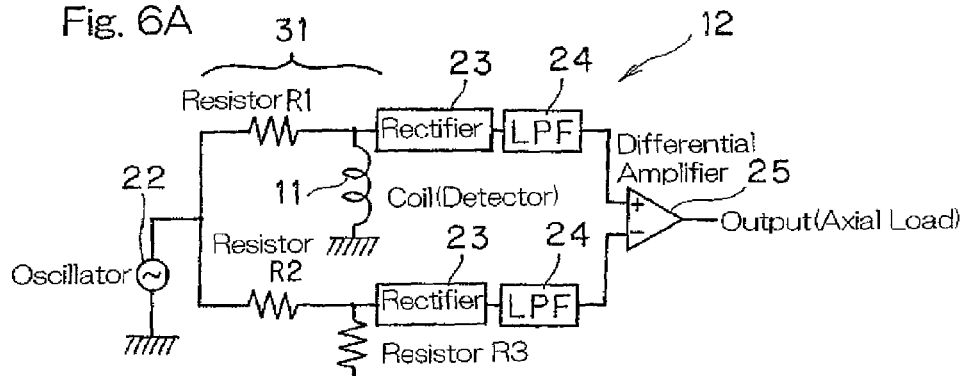
FIGS. 6A to 6C are block circuit diagrams showing different processing circuits that are employed in dependence on the number of load sensors.
Figure 6B:
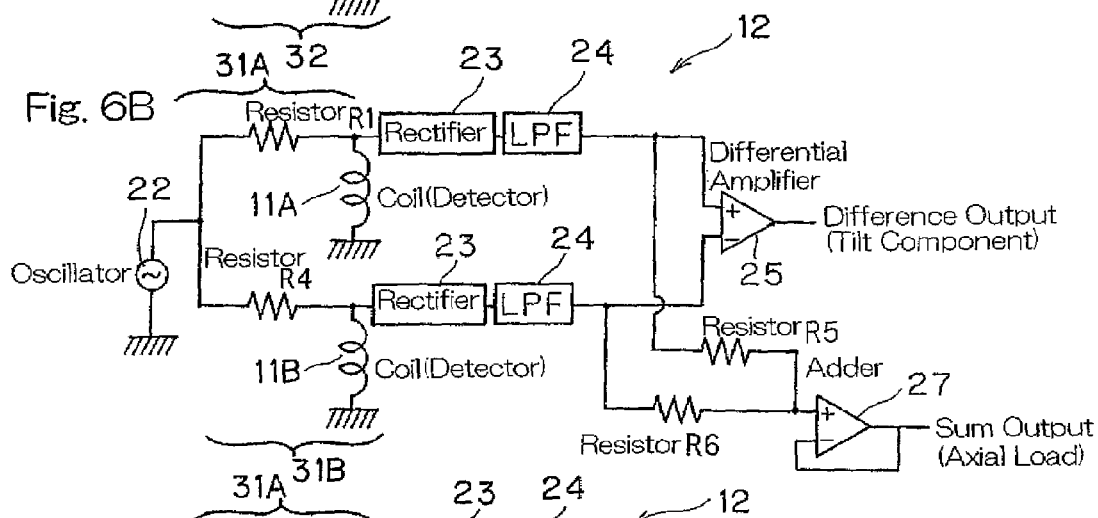
Figure 6C:
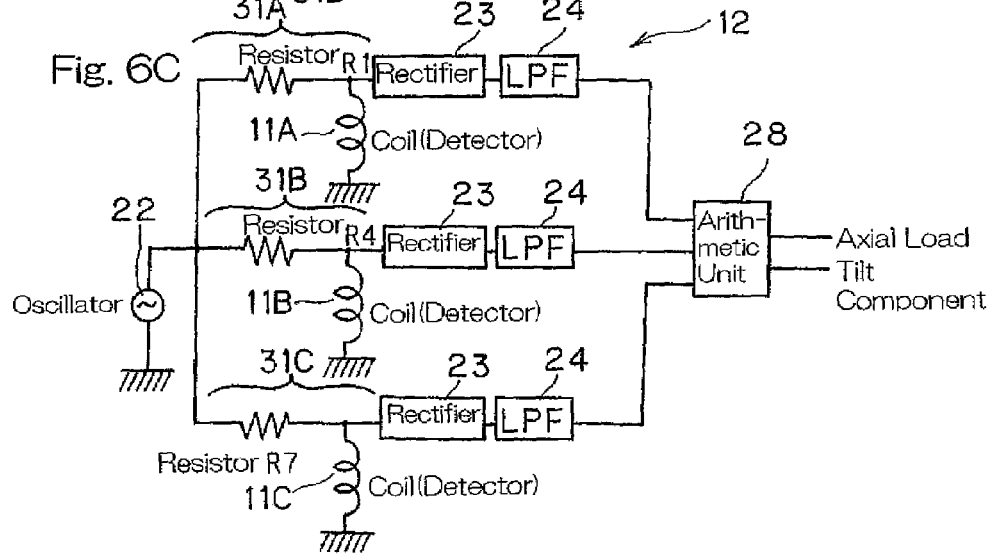

FIGS. 6A to 6C illustrate various examples of the processing circuit 12 that forms a processing means for processing a detection signal outputted from the load sensor 9. In particular, FIG. 6A illustrates the processing circuit 12 utilizable when only one load sensor 9 is employed, FIG. 6B illustrates the processing circuit 12 utilizable when two load sensors 9 are employed, and FIG. 6C illustrates the processing circuit 12 utilizable when three load sensors 9 are employed.

Referring to FIG. 6A, the processing circuit 12 includes a first series circuit portion 31 made up of a resistor R1 and the coil 11, a second series circuit portion 32 made up of two resistors R2 and R3 and connected parallel to the first series circuit portion 31, and an oscillator 22 for applying an alternating current voltage to both of the first and second series circuit portions 31 and 32. A divided voltage across the coil 11 is converted by means of a rectifier 23 and a low pass filter 24 into a direct current voltage, which is subsequently supplied to a first input terminal of a differential amplifier 25. On the other hand, a voltage across the resistor R2 of the second series circuit portion 32 is, after having been converted into a direct current voltage by means of a rectifier 23 and a low pass filter 24, supplied as a reference voltage to a second input terminal of the differential amplifier 25. The differential amplifier 25 in turn outputs a signal indicative of the difference between the reference voltage from the second series circuit portion 32 and the direct current voltage converted from the divided voltage across the coil 11.

When the load acting on the magnetostrictive element 10 changes, the magnetic permeability of the magnetostrictive element 10 changes, causing change in the inductance of the coil 11. This results in change of the divided voltage across the coil 11, and accordingly, the output from the differential amplifier 25 changes in a quantity corresponding to the amount of such change of the divided voltage across the coil 11. In the example shown in FIG. 6A, in which the single load sensor 9 is employed, the differential amplifier 25 detects only the magnitude of the load, that is, only the load acting axially on the vehicle body fitting flange 1a. The output from the differential amplifier 25, that is a detection signal outputted from the load sensor 9, is transmitted wireless from a transmitter 26 (shown in FIG. 1) to a receiver (not shown) provided in the vehicle body structure.

Referring now to FIG. 6B showing the processing circuit 12 utilizable when two load sensors 9 are employed, this processing circuit 12 includes a first series circuit portion 31A made up of a resistor R1 and a coil 11A included in the first load sensor 9, a second series circuit portion 31B made up of a resistor R4 and a coil 11B of a second load sensor 9 and connected parallel to the first series circuit portion 31A, and an oscillator 22 for supplying an alternating current voltage to both of the first and second series circuit portions 31A and 31B. A divided voltage applied to the coil 11A of the first load sensor 9 is, after having been converted into a direct current voltage by means of a rectifier 23 and a low pass filter 24, supplied to a first input terminal of a differential amplifier 25. On the other hand, a divided voltage applied to the coil 11B of the second load sensor 9 is also supplied to a second input terminal of the differential amplifier 25 after having been converted into a direct current voltage by means of a rectifier 23 and a low pass filter 24. The differential amplifier 25 in turn outputs a signal indicative of the difference between the direct current voltages from the first and second series circuit portions 31A and 31B, respectively.

The difference output from the differential amplifier 25 is indicative of a tilt component of the load, that is, the direction of the load (the direction of bending). By way of example, if the first and second load sensors 9 are arranged respectively in the upper and lower bolt insertion holes 21 in the vehicle body fitting flange 1a as viewed in FIG. 5A, the tilt component of the acting load in a vertical direction can be detected. Also, when the first and second load sensors 9 are arranged respectively in the left and right bolt insertion holes 21 in the vehicle body fitting flange 1a as viewed in FIG. 5A, the tile component of the acting load in a horizontal direction can be detected.

The two inputs respectively from the first and second series circuit components 31A and 31B are also supplied through respective resistors R5 and R6 to an adder 27 where the two inputs are added. A sum output from the adder 27 is indicative of the magnitude of the load, that is, the load acting axially on the vehicle body fitting flange 1a.

Thus, where a plurality of load sensors 9 are employed, not only the magnitude of the load, but also the direction (bending direction) in which the load acts can be detected. Even in this case, those output signals are transmitted wireless from the transmitter 26 to the receiver in the vehicle body structure.

It is to be noted that where four load sensors 9 are employed, one processing circuit 12 and two load sensors 9 are paired and, hence, two pairs are provided. In this case, the two load sensors 9 in the first pair are arranged at upper and lower positions and the two load sensors 9 in the second pair are arranged at left and right positions, so that the load acting in the axial direction and the tilt component (in the horizontal direction or the vertical direction) can be detected at upper and lower positions and left and right positions, respectively.

FIG. 6C illustrates the processing circuit 12 utilizable when three load sensors 9 are employed. This processing circuit 12 includes a first series circuit portion 31A made up of a resistor R1 and a coil 11A of the first load sensor 9, a second series circuit portion 31B made up of a resistor R4 and a coil 11B of the second load sensor 9, a third series circuit portion 31C made up of a resistor R7 and a coil 11C of the third load sensor 9, and an oscillator 22 for supplying an alternating current voltage to those first to third series circuit portions 31A to 31C. Those first to third series connected circuits 31A to 31C are connected parallel to each other and are in turn connected with an arithmetic unit 28. Hence, divided voltages applied to the coils 11A to 11C of the first to third load sensors 9 are, after having been converted into respective direct current voltages by means of associated rectifiers 23 and associated low pass filters 24, inputted to the arithmetic unit 28, from which signals indicative of a summed value of those inputs and of a difference value among those inputs are subsequently outputted. The summed value is indicative of the load acting axially on the vehicle body fitting flange 1a, while the difference value is indicative of the direction of the load (bending direction).

Specifically, the arithmetic unit 28 is so configured that the differences between every two of the respective outputs of the first to third load sensors 9 can be calculated as a difference value, so that the direction of the load in the vertical direction and that in a forward and rearward direction can be detected. Even in this case, those outputs are transmitted wireless from the transmitter 26 to the receiver in the vehicle body structure.

As described hereinabove, in the wheel support bearing assembly according to the first embodiment of the present invention, since the load sensor 9 is disposed in the respective bolt insertion hole 21 defined in the vehicle body fitting flange 1a of the outer member 1, the load sensor 9 can be compactly mounted on the vehicle body structure. Accordingly, since the output from the load sensor 9 changes when the load acts on the vehicle body fitting flange 1a as a compressive force or a tensile force, change of the load acting on the vehicle wheel 18 can be detected. In view of this, if the change of the output from the load sensor 9 is used as information to control an automobile suspension system or the like, control of the attitude assumed by an automotive vehicle during the travel thereof, for example, prevention of the rolling of the automotive vehicle during the cornering, prevention of the front wheel sag during the braking, prevention of the vehicle body tilting during travel on a non-leveled road surface, and/or prevention of the vehicle body sinking or lowering brought about by uneven distribution of load on the vehicle can be accomplished.

Also, since the load sensor 9 makes use of the magnetostrictive element 10 or the piezoelectric element as a load detecting element having its electric characteristic variable in dependence on the load, detection of the applied load can be achieved with high sensitivity based on strains incurred in the vehicle body fitting flange 1a. Also, the signal processing circuit for processing the detected load signal can be configured simply as shown in FIG. 6.

In addition, where the magnetostrictive element 10, which is a load detecting element of the respective load sensor 9, is mounted in the corresponding bolt 19, the associated coil 11 is merely mounted in the corresponding bolt insertion hole 21 and, therefore, the load sensor 9 can be installed compactly. In such case, the load acting on the vehicle body fitting flange 1a can be indirectly detected through the bolt 19.

Yet, according to the first embodiment, since the detected load signal from the load sensor 9 is transmitted wireless from the transmitter 26 (shown in FIG. 1), wiring between a control device on the vehicle body structure for capturing the detected load signal and the load sensor 9 can advantageously be dispensed with, allowing the load sensor 9 to be installed compactly.

Figure 7:
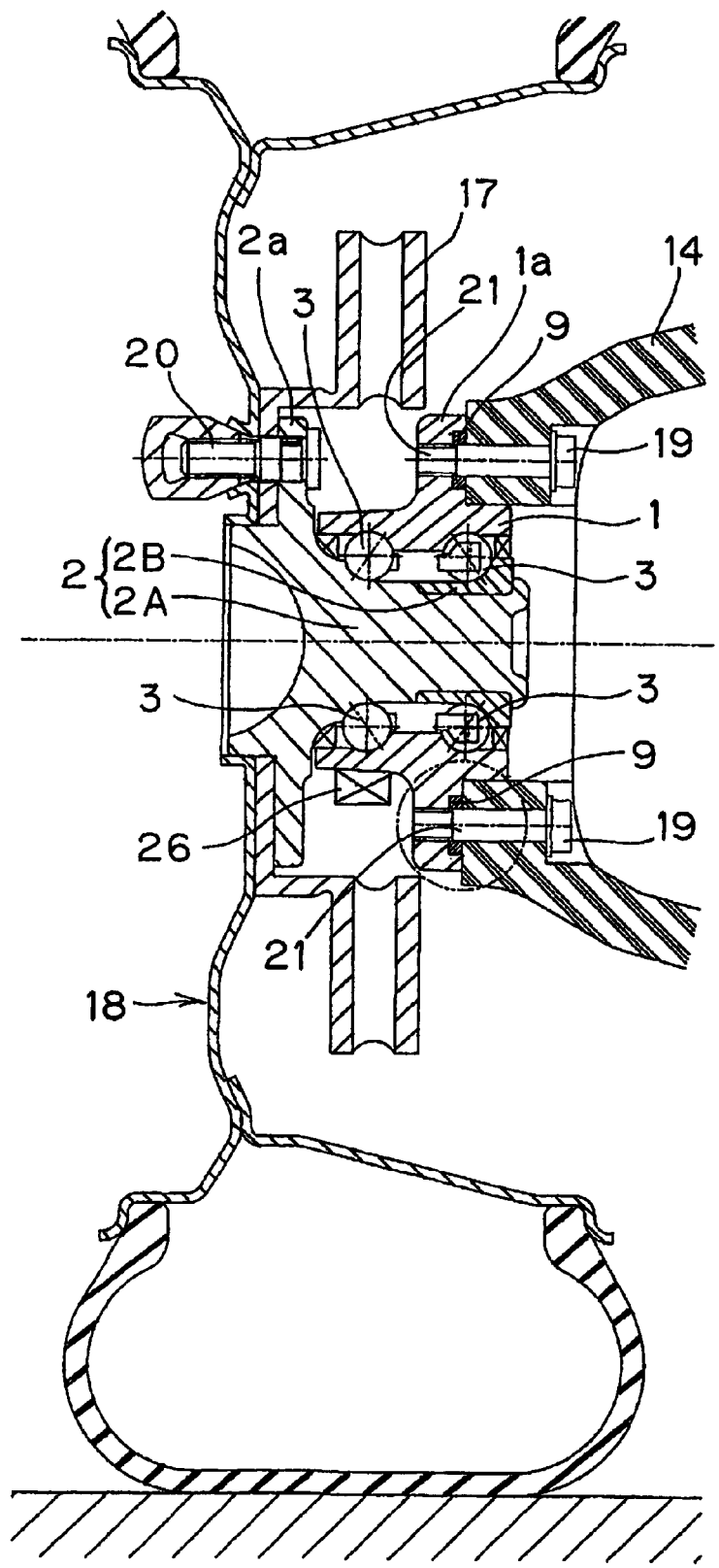
FIG. 7 is a longitudinal sectional view of the sensor-integrated wheel support bearing assembly according to a second preferred embodiment of the present invention, showing a support structure for supporting a vehicle driven wheel.

FIG. 7 illustrates a second preferred embodiment of the present invention. This second embodiment is directed to a third generation type wheel support bearing assembly of an inner race rotating model and is a hub bearing assembly that is used to rotatably support a vehicle driven wheel. This wheel support bearing assembly for the support of the vehicle driven wheel differs from that for the support of the vehicle drive wheel shown and described in connection with the first embodiment, in that in this embodiment the constant velocity universal joint 15 is not connected to the hub axle 2A of the inner member 2. Other structural features of the wheel support bearing assembly shown in FIG. 7 are similar to those shown and described in connection with the first embodiment. It is to be noted that the first embodiment is to be understood as including the various modifications shown in and described with reference to FIGS. 4 to 6 and those modifications are to be understood as equally applicable not only to the second embodiment shown in FIG. 7, but also to other various embodiments of the present invention shown in FIGS. 8 to 13.

Figure 8:
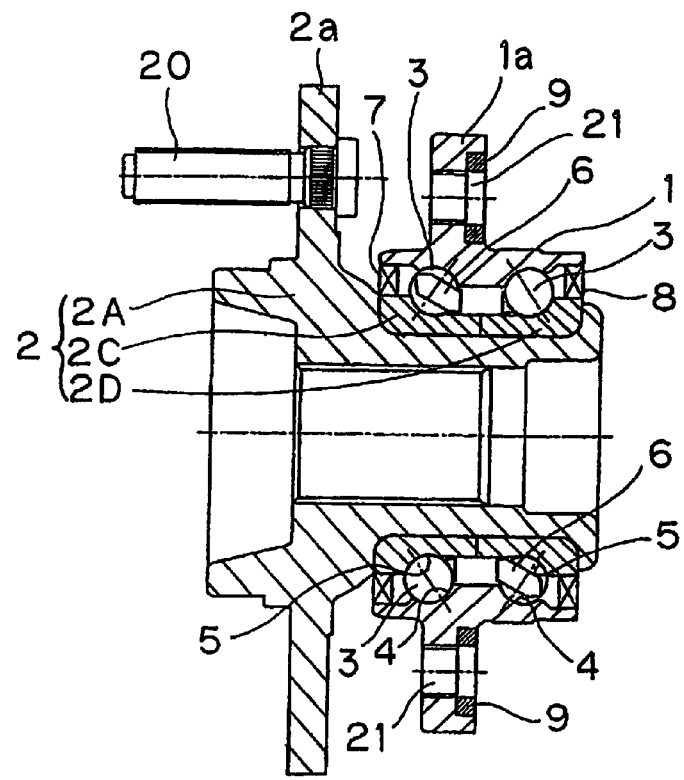
FIG. 8 is a longitudinal sectional view of the sensor-integrated wheel support bearing assembly according to a third preferred embodiment of the present invention.

A third preferred embodiment of the present invention is shown in FIG. 8. The sensor-integrated wheel support bearing assembly shown therein is a 2.5 generation type wheel support bearing assembly of an inner race rotating model that is used to rotatably support a vehicle drive wheel. In this embodiment, the inner member 2 is made up of a hub axle 2A and a pair of split type inner races 2C and 2D mounted on an outer periphery of an axle portion of the hub axle 2A. The inner races 2C and 2D have their respective outer peripheral surfaces formed with the associated raceway surfaces 5 and 5. As is the case with the first embodiment, the stem portion of the constant velocity universal joint is inserted into the axial bore of the hub axle 2A and splined thereto for rotation together therewith, but the constant velocity universal joint is not shown in FIG. 8. Other structural features of the wheel support bearing assembly shown in FIG. 8 are similar to those shown and described in connection with the first embodiment.

Figure 9:
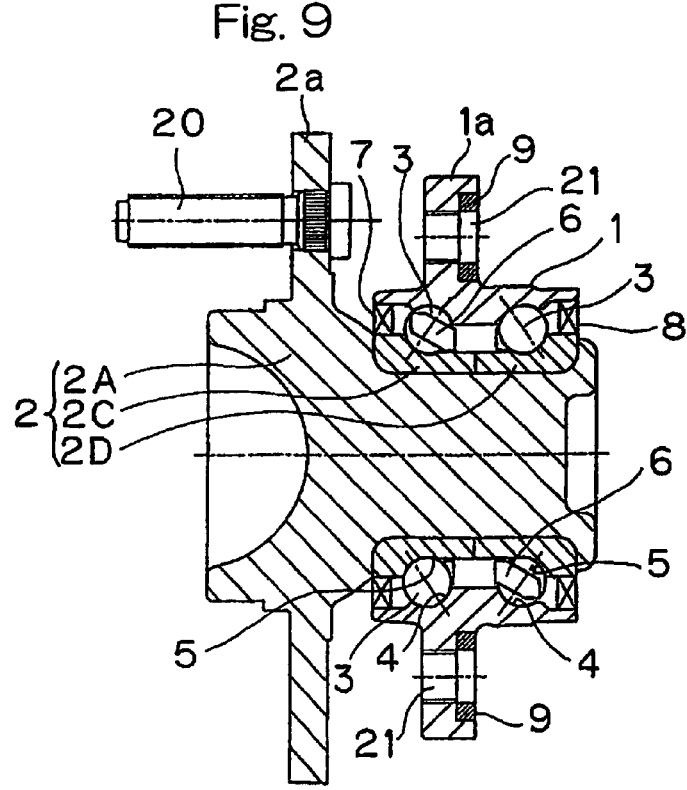
FIG. 9 is a longitudinal sectional view of the sensor-integrated wheel support bearing assembly according to a fourth preferred embodiment of the present invention.

FIG. 9 illustrates a fourth preferred embodiment of the present invention. The sensor-integrated wheel support bearing assembly shown therein is a 2.5 generation type wheel support bearing assembly of an inner race rotating model that is used to rotatably support a vehicle driven wheel. This wheel support bearing assembly differs from that of the third embodiment shown in FIG. 8, in that in this embodiment, the hub axle 2A of the inner member 2 is not coupled with the constant velocity universal joint. Other structural features of the wheel support bearing assembly shown in FIG. 9 are similar to those described in connection with the embodiment shown in FIG. 8.

Figure 10:
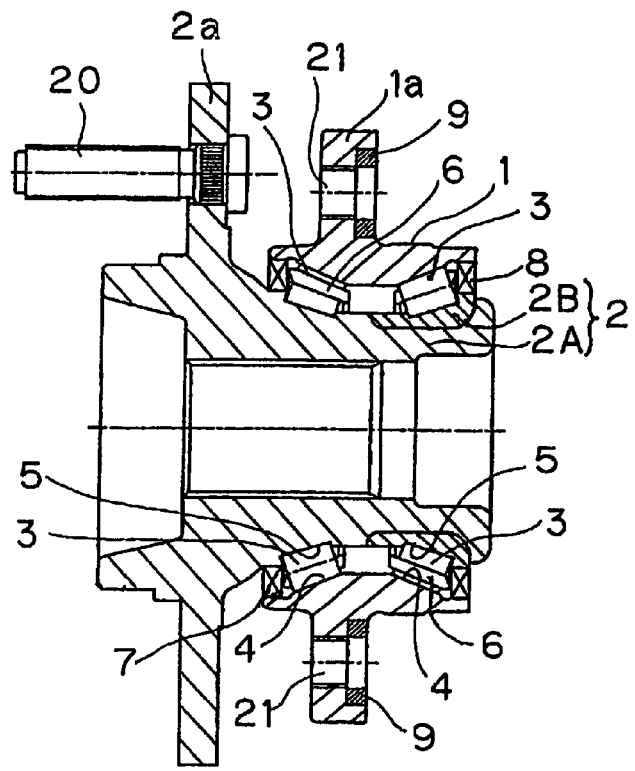
FIG. 10 is a longitudinal sectional view of the sensor-integrated wheel support bearing assembly according to a fifth preferred embodiment of the present invention.

FIG. 10 illustrates a fifth preferred embodiment of the present invention. The sensor-integrated wheel support bearing assembly shown therein is a third generation type wheel support bearing assembly of an inner race rotating model that is used to rotatably support a vehicle drive wheel. The wheel support bearing assembly shown in FIG. 10 differs from that of the first embodiment shown, in that in this embodiment, instead of the rolling balls, tapered rollers are employed for the rolling elements to render the bearing assembly to represents a dual tapered roller bearing. Other structural features of the wheel support bearing assembly shown in FIG. 10 are similar to those shown and described in connection with the first embodiment.

Figure 11:
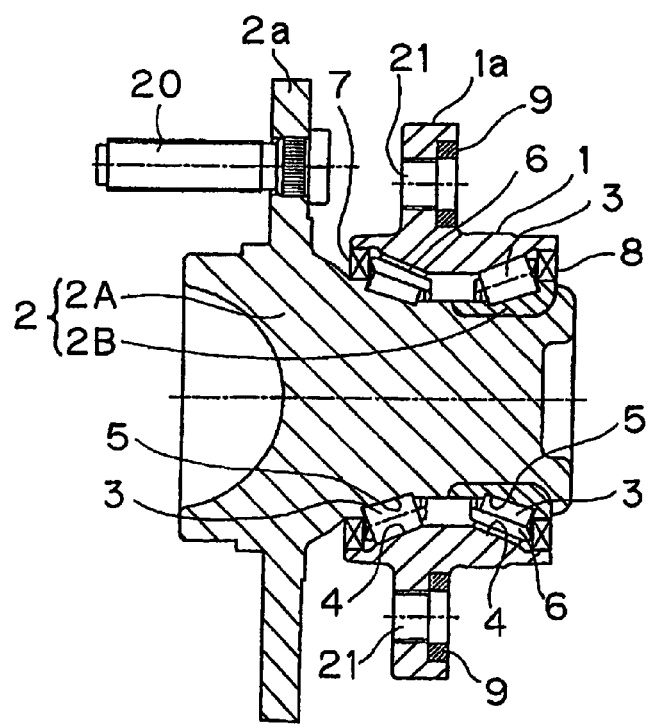
FIG. 11 is a longitudinal sectional view of the sensor-integrated wheel support bearing assembly according to a sixth preferred embodiment of the present invention.

FIG. 11 illustrates a sixth preferred embodiment of the present invention. The sensor-equipped wheel support bearing assembly shown therein is a third generation type wheel support bearing assembly of an inner race rotating model that is used to rotatably support a vehicle drive wheel. The wheel support bearing assembly shown in FIG. 11 differs from that of the second embodiment shown in FIG. 7, in that in this embodiment, instead of the rolling balls, tapered rollers are employed for the rolling elements 3 to render the bearing assembly to represents a dual tapered roller bearing. Other structural features of the wheel support bearing assembly shown in FIG. 11 are similar to those described in connection with the embodiment shown in FIG. 7

Figure 12:
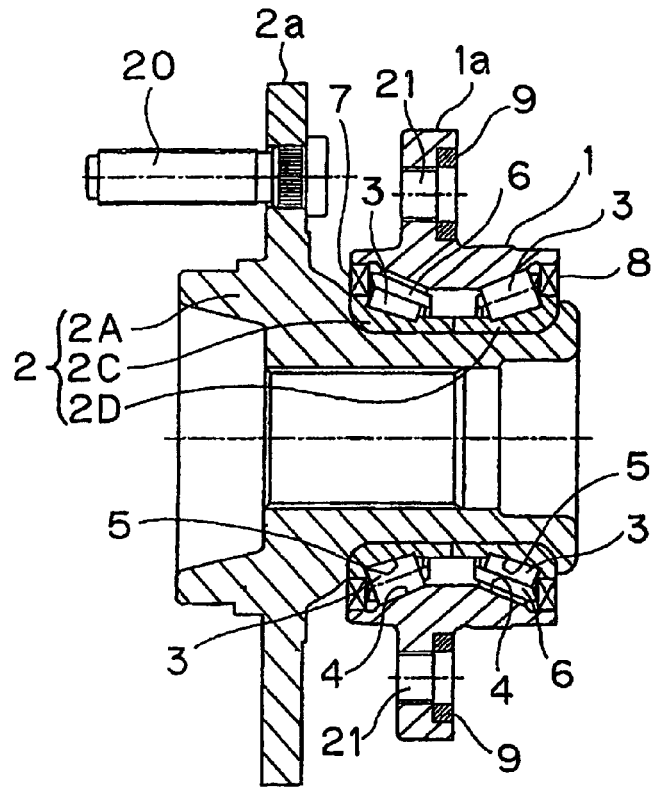
FIG. 12 is a longitudinal sectional view of the sensor-integrated wheel support bearing assembly according to a seventh preferred embodiment of the present invention.

FIG. 12 illustrates a seventh preferred embodiment of the present invention. The sensor-equipped wheel support bearing assembly shown therein is a 2.5 generation type wheel support bearing assembly of an inner race rotating model that is used to rotatably support a vehicle drive wheel. This wheel support bearing assembly shown in FIG. 12 differs from that of the fifth embodiment shown in FIG. 10, in that in this embodiment, the inner member 2 is made up of a hub axle 2A and a pair of split type inner races 2C and 2D mounted on an outer periphery of an axle portion of the hub axle 2A. The inner races 2C and 2D have their respective outer peripheral surfaces formed with the associated raceway surfaces 5 and 5. Other structural features of the wheel support bearing assembly shown in FIG. 12 are similar to those described in connection with the embodiment shown in FIG. 10.

Figure 13:
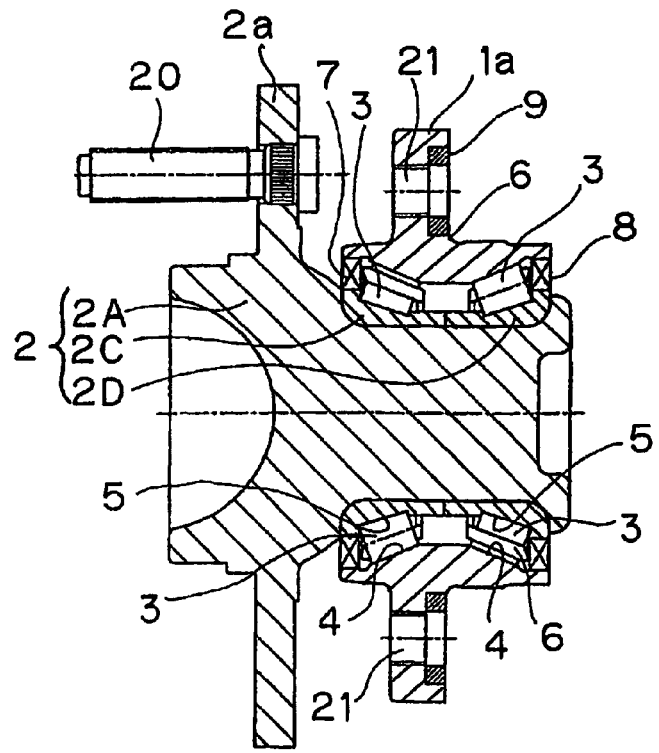
FIG. 13 is a longitudinal sectional view of the sensor-integrated wheel support bearing assembly according to an eighth preferred embodiment of the present invention.
Figure 14:
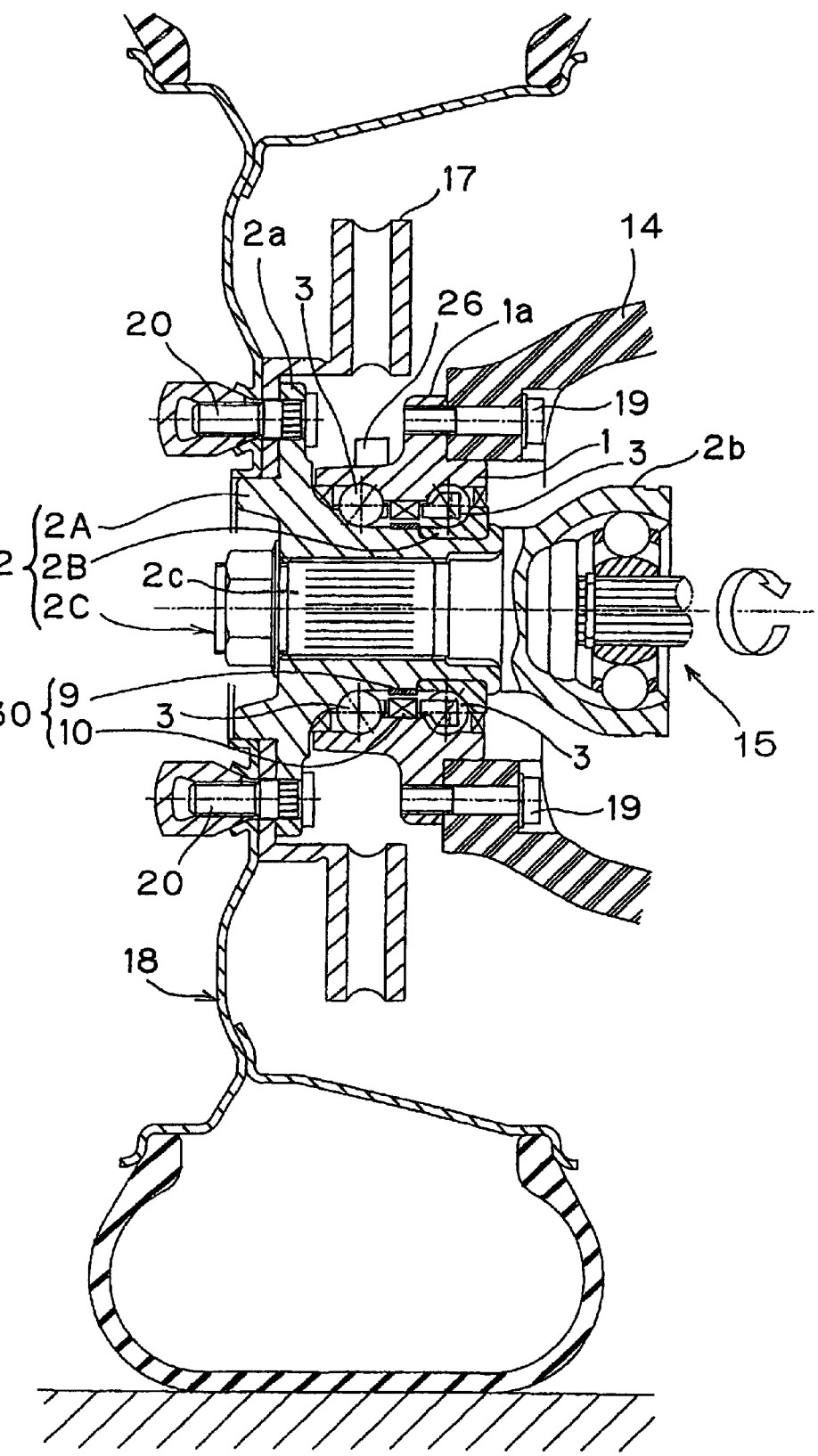
FIG. 14 is a longitudinal sectional view of the sensor-integrated wheel support bearing assembly according to a ninth preferred embodiment of the present invention, showing the support structure for supporting the vehicle drive wheel.

FIG. 13 illustrates an eighth preferred embodiment of the present invention. The sensor-equipped wheel support bearing assembly shown therein is a 2.5 generation type wheel support bearing assembly of an inner race rotating model that is used to rotatably support a vehicle driven wheel. This wheel support bearing assembly shown in FIG. 13 differs from that of the seventh embodiment shown in FIG. 12, in that in this embodiment, the hub axle 2A of the inner member 2 is not coupled with the constant velocity universal joint. Other structural features of the wheel support bearing assembly shown in FIG. 13 are similar to those described in connection with the embodiment shown in FIG. 12.

It is to be noted that although in any one of the first to eighth embodiments of the present invention, the load sensor 9 has been described as disposed in the bolt insertion hole 21 defined in the vehicle body fitting flange 1a, a broad aspect of the present invention includes disposition of the load sensor 9 in one of the outer member 1 and the inner member 2, that serves as a stationary member, and at any position in the stationary member.

Hereinafter, ninth to fourteenth preferred embodiments of the present invention will be described in connection with a sensor-integrated wheel support bearing assembly equipped with a torque sensor for detection of the torque of a vehicle wheel.

FIGS. 14 to 19 illustrate the ninth preferred embodiment of the present invention. This embodiment is directed to a third generation type wheel support bearing assembly of an inner race rotating model that is used to rotatably support a vehicle drive wheel. The wheel support bearing assembly shown in FIGS. 14 and 15 has a basic structure substantially identical to that of the wheel support bearing assembly shown in FIGS. 1 and 2 and described in connection with the first embodiment of the present invention and, therefore, the details thereof are not reiterated for the sake of brevity while like parts are designated by like reference numerals.

Figure 15:
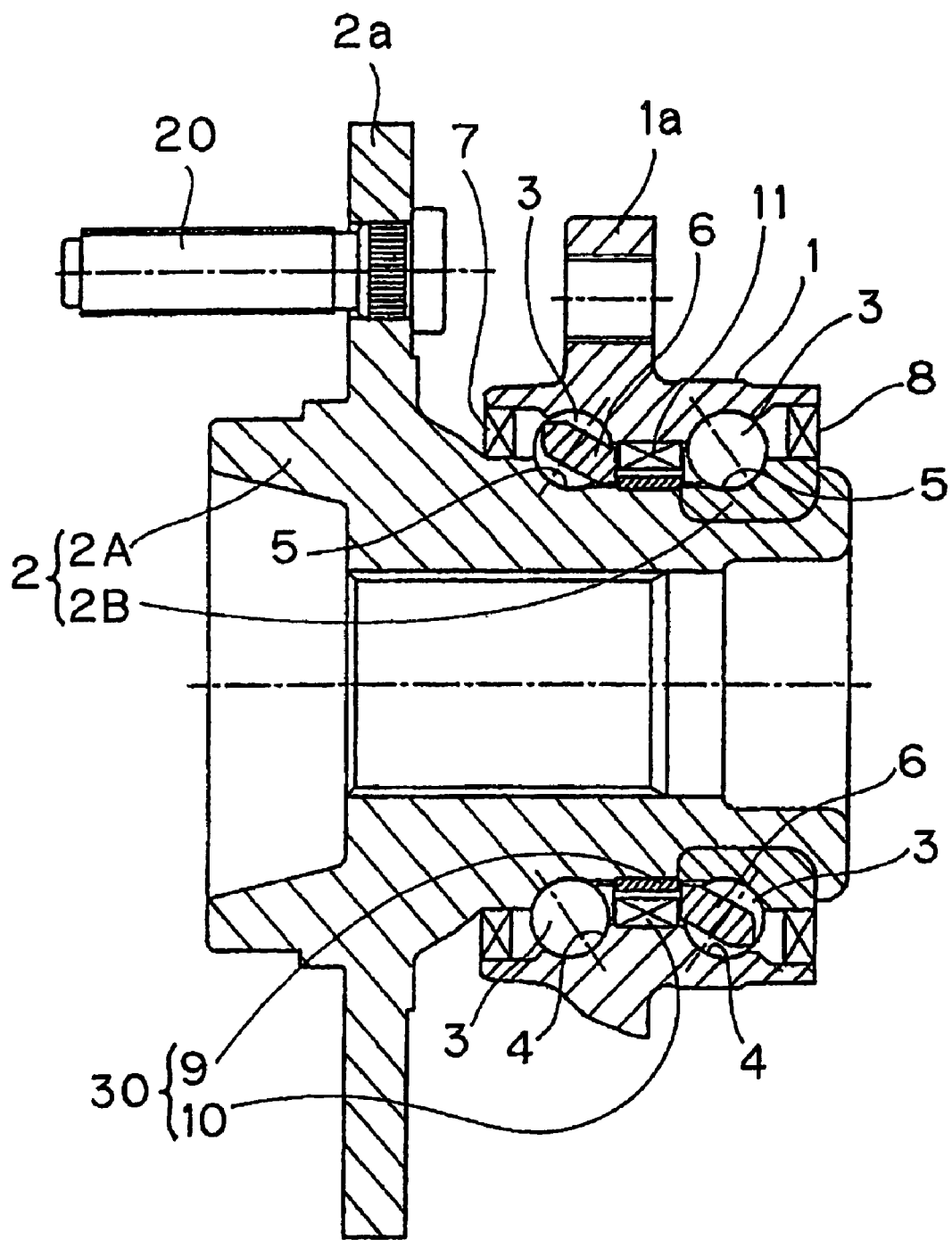
FIG. 15 is a longitudinal sectional view of the sensor-integrated wheel support bearing structure shown in FIG. 14.

As shown in FIG. 15, a to-be-detected element 9 made of a magnetostrictive material is formed on an outer periphery of the inner member 2 and is positioned generally intermediate between the raceway surfaces 5 and 5. On the other hand, a torque detecting element 10 is disposed on the outer member 1 in face-to-face relation with the to-be-detected element 9. The to-be-detected element 9 and the torque detecting element 10 altogether form a torque sensor 30.

The torque detecting element 10 is operable to detect change in magnetic characteristic of the to-be-detected element 9 to thereby detect the working torque of a drive shaft fitted to the inner member 2. In this ninth embodiment, as the magnetostrictive material forming the to-be-detected element 9, an alloy of iron and aluminum is employed. The torque detecting element 10 is comprised of a single coil 11 so provided on the outer member 1 as to encircle the to-be-detected element 9. A detecting circuit 12 (See FIGS. 18 and 19.) utilizing the coil 11 as one of its circuit component parts is employed.

Figure 16A:
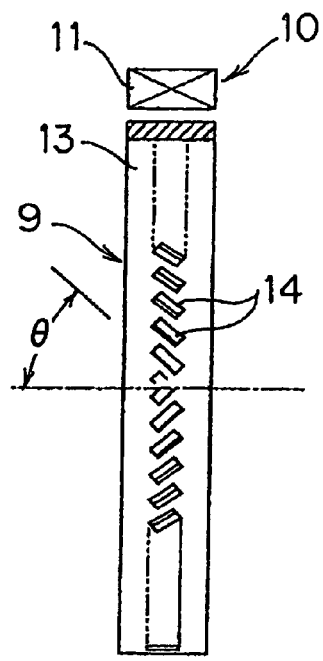
FIG. 16A is a front elevational view of one example of a to-be-detected element employed in the bearing assembly of FIG. 15, with an upper portion thereof shown in section.
Figure 16B:
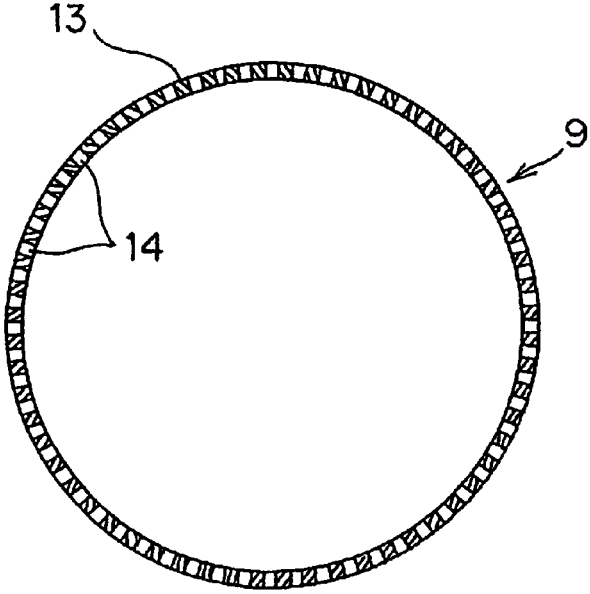
FIG. 16B is a side sectional view of the to-be-detected element of FIG. 16A.

FIGS. 16A and B illustrate the details of the to-be-detected element 9. FIG. 16A is a front elevational view of the to-be-detected element 9 (shown together with the torque detecting element 10) with an upper half thereof cut out and FIG. 16B is a side sectional view of the to-be-detected element 9. The to-be-detected element 9 includes a hollow cylindrical body 13, made of magnetostrictive material, having a circular row of a plurality of inclined grooves 14 that deploy in a direction circumferentially of the hollow cylindrical body 13. The grooves 14 are inclined at a predetermined angle $\theta$ of inclination, for example, 45°, relative to the axial direction of the bearing assembly. The magnetostrictive material used to form the cylindrical body 13 is an alloy of iron and aluminum as described previously. Each of the inclined grooves 14 has a depth of, for example, 0.1 mm or greater. However, the inclined grooves 14 may extend completely across the thickness of the hollow cylindrical body 13 or may be formed on one of inner and outer peripheral surface areas of the cylindrical body 13.

Figure 17A:
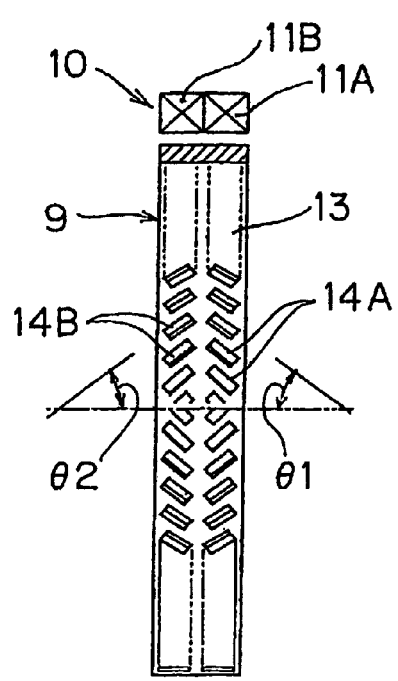
FIG. 17A is a front elevational view of another example of the to-be-detected element employed in the bearing assembly of FIG. 15, with the upper portion thereof shown in section.
Figure 17B:
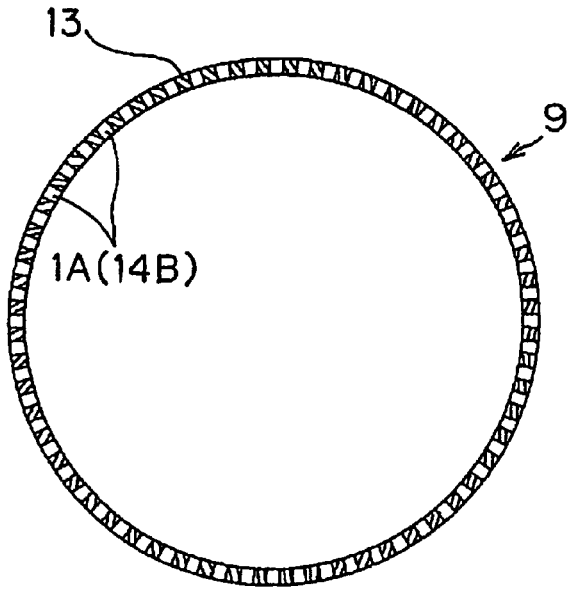
FIG. 17B is a side sectional view of the to-be-detected element of FIG. 16A.

FIGS. 17A and B illustrate a modification of the to-be-detected element 9. FIG. 17A is a front elevational view of the to-be-detected element 9 (shown together with the torque detecting element 10) with an upper half thereof cut out and FIG. 17B is a side sectional view of the to-be-detected element 9. The to-be-detected element 9 includes a hollow cylindrical body 13, made of magnetostrictive material, having two circular rows of a plurality of inclined grooves 14A and 14B that deploy in a direction circumferentially of the hollow cylindrical body 13. The grooves 14 are inclined at a predetermined angle of inclination relative to the axial direction of the bearing assembly. One of the rows of the inclined grooves, for example, the row of the inclined grooves 14A are inclined at an angle $\theta 1$ relative to the axial direction and the other row of the inclined grooves 14B are inclined at an angle $\theta 2$ relative to the axial direction, which angles $\theta 1$ and $\theta 2$ are opposite in sense to each other. The angles $\theta 1$ and $\theta 2$ of inclination of the grooves 14A and 14B may be equal to each other, for example, 45°. Each of the inclined grooves 14A and 14B has an equal depth of, for example, 0.1 mm or greater.

Where the to-be-detected element 9 shown in FIG. 17A is employed, the torque detecting element 10 is configured to include two coils 11A and 11B aligned respectively with the rows of the inclined grooves 14A and 14B. The respective inductance of those coils 11A and 11B are chosen to be equal to each other, assuming that no change occurs in torque.

It is, however, to be noted that instead of the inclined grooves 14 or 14A and 14B being formed in the cylindrical body 13, the to-be-detected element 9 may include similar inclined grooves that are formed by thermally spraying a magnetostrictive material onto the outer peripheral surface of the hub axle 2A to form a magnetostrictive layer and then grooving the magnetostrictive layer to form those inclined grooves. Alternatively, instead of the use of the inclined grooves, magnetostrictive pieces (not shown) patterned in a shape similar to the inclined grooves 14 or 14A and 14B may be formed, which are then used as the to-be-detected element 9. It is also to be noted that the cylindrical body 13 may not contain the magnetostrictive material, in which case the magnetostrictive material is to be embedded within the inclined grooves 14 or 14A and 14B.

Figure 18:
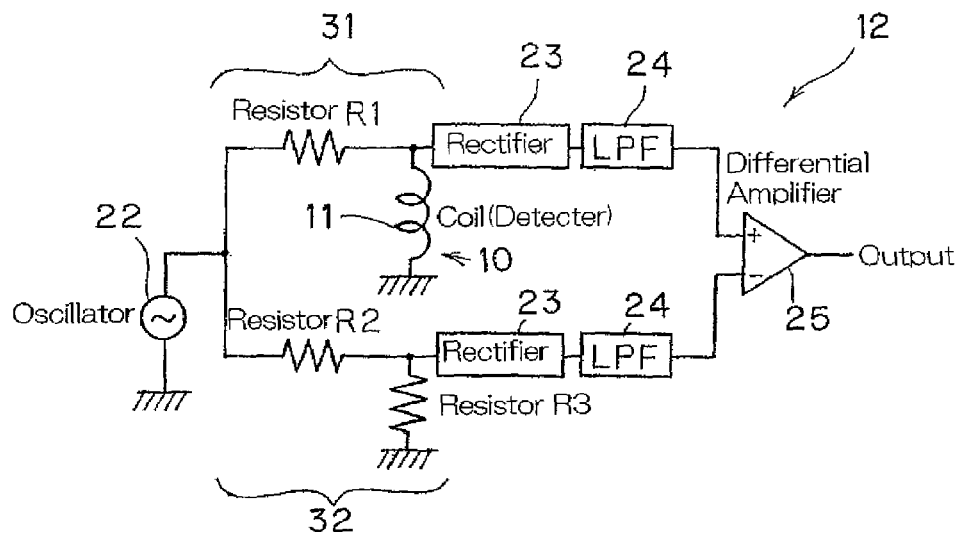
FIG. 18 is a circuit block diagram showing a detecting circuit in a torque sensor for the to-be-detected element shown in FIG. 16.

FIG. 18 illustrates an example of the detecting circuit 12 for the torque sensor 30, which can be employed where the to-be-detected element 9 includes the single circular row of the inclined grooves 14. The detecting circuit 12 shown in FIG. 18 is of a basic circuit structure substantially similar to the processing circuit 12 (FIG. 6A) utilizable where the single load sensor 9 is employed, and functions in a manner similar to that processing circuit 12 and, therefore, the details thereof are not reiterated for the sake of brevity.

In this case, by the effect of the torque acting on the to-be-detected element 9, which brings about change in magnetic permeability of the magnetostrictive material forming the to-be-detected element 9, the inductance of the coil 11 changes with the divided voltage across the coil 11 changing consequently. This in turn results in change of the output from the differential amplifier 25 in a quantity corresponding to the amount of change of the divided voltage across the coil 11, which output is indicative of a change in torque acting on the drive shaft. The output from the differential amplifier 25, which is a detection signal from the torque detecting element 10, is subsequently transmitted wireless from the transmitter 26 (shown in FIG. 14) to the receiver (not shown) installed on the vehicle body structure.

Figure 19:
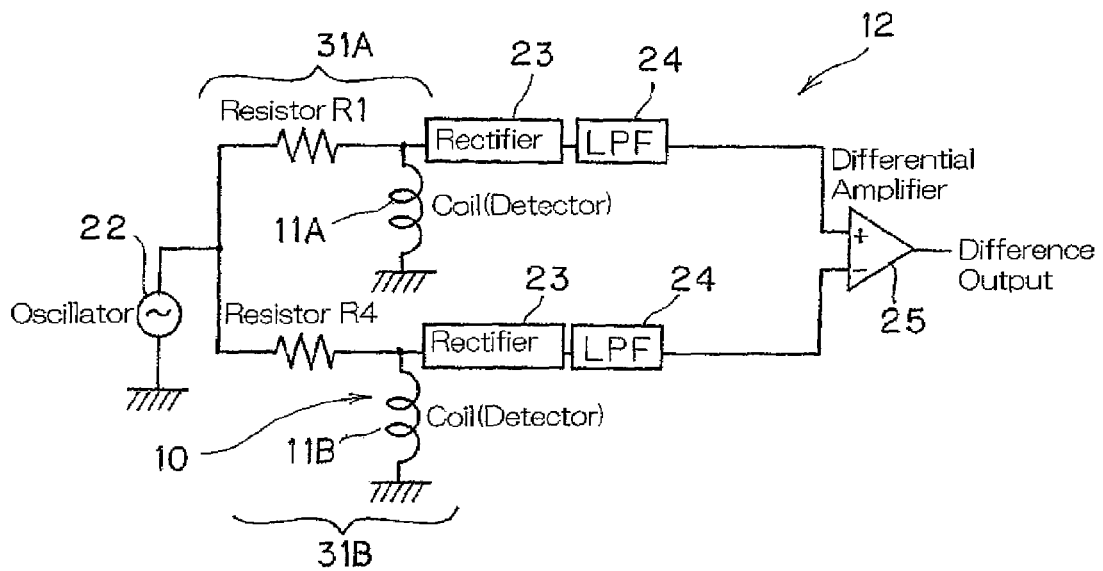
FIG. 19 is a circuit block diagram showing a detecting circuit in a torque sensor for the to-be-detected element shown in FIG. 17.

FIG. 19 illustrates another example of the detecting circuit 12 for the torque sensor 30, which can be employed where the to-be-detected element 9 includes the two circular rows of the inclined grooves 14A and 14B. The detecting circuit 12 includes a first series circuit portion 31A made up of a resistor R1 and a coil 11A arranged in face-to-face relation with the first row of the inclined grooves 14A of the to-be-detected element 9, a second series connected circuit 31B made up of a resistor R4 and a coil 11B arranged in face-to-face relation with the second row of the inclined grooves 14B and connected in parallel to the first series circuit portion 31A, and an oscillator 22 for supplying an alternating current voltage to both of the first and second series circuit portions 31A and 31B.

A divided voltage applied to the coil 11A of the first load sensor 9 is, after having been converted into a direct current voltage by means of a rectifier 23 and a low pass filter 24, supplied to a first input terminal of a differential amplifier 25. On the other hand, a divided voltage applied to the coil 11B of the second load sensor 9 is also supplied to a second input terminal of the differential amplifier 25 after having been converted into a direct current voltage by means of a rectifier 23 and a low pass filter 24. The differential amplifier 25 in turn outputs a signal indicative of the difference between the direct current voltages supplied thereto from the first and second series circuit portions 31A and 31B, respectively. The difference output from the differential amplifier 25 is indicative of the torque acting on an axle of the vehicle wheel (vehicle drive wheel) 18 and is transmitted wireless from a transmitter 26 to a receiver (not shown) installed on the vehicle body structure in a manner similar to that described with reference to FIG. 18.

In the wheel support bearing assembly of the ninth embodiment, since the to-be-detected element 9 made of the magnetostrictive material is provided on the outer peripheral surface of the inner member 2 in combination with the torque detecting element 10 provided on the outer member 1 in face-to-face relation therewith, the torque sensor 30 including the to-be-detected element 9 and the torque detecting element 10 can be installed compactly in the automotive vehicle. Based on the detected torque information obtained from each of the torque sensors 30 mounted in respective wheel support bearing assemblies one for each of the vehicle wheels, the vehicle driving system can be controlled to thereby accomplish the control of the attitude assumed by the automotive vehicle during the travel thereof.

Since the to-be-detected element 9 is disposed intermediate between the raceway surfaces 5 and 5, the space available between the raceway surfaces 5 and 5 can be utilized efficiently to accommodate the to-be-detected element 9. This is particularly advantageous in that no extra space for accommodating the to-be-detected element 9 and the torque detecting element 10 held in face-to-face relation with the to-be-detected element 9 is required any more and, hence, without increasing the size of the wheel support bearing assembly, the torque detecting element 10 can be compactly disposed inside the wheel support bearing assembly.

Since the to-be-detected element 9 makes use of an alloy of iron and aluminum as a magnetostrictive material, it is excellent in magnetostrictive characteristic and a high sensitivity torque detection can be accomplished.

Where the to-be-detected element 9 includes the circular row of the inclined grooves 14 formed in the cylindrical body 13 as shown in FIG. 16, a tensile stress or a compressive stress acts on the inclined grooves 14, when the torque acts on the shaft or axle, with the change in magnetic permeability of the to-be-detected element 9 enhanced. For this reason, a high sensitivity torque detection can be accomplished, using the detecting circuit 12 shown in FIG. 18. Also, since the inclined grooves 14 are formed in the cylindrical body 13 that is mounted on the outer peripheral surface of the inner member 2, not directly in the outer peripheral surface of the inner member 12, they little affect the manufacture and the strength of the inner member 2. Also, since the inclined grooves 14 has a depth chosen to be 0.1 mm or greater, the detecting sensitivity can be secured.

On the other hand, where the to-be-detected element 9 includes the two circular rows of the inclined grooves 14A and 14B formed in the cylindrical body 13 such as shown in FIG. 17, when the torque acts on the shaft or axle, a tensile stress is developed in the first row of the inclined grooves 14A, causing a compressive stress to develop in the second row of the inclined grooves 14B. For this reason, when the difference between the detected values (changes in impedance) of the respective coils 11A and 11B associated with the corresponding rows of the inclined grooves 14A and 14B is outputted as the detection signal indicative of the change in torque as shown in FIG. 19, the direction and the magnitude of the torsional torque acting on the shaft or axle can be ascertained from the polarity (positive or negative) and the magnitude of the output.

Also, since in the ninth embodiment, the detection signal outputted from the torque detecting element 10 is transmitted wireless from the transmitter 26 (FIG. 14) to the receiver installed on the side of the vehicle body structure, wiring between a control device on the vehicle body structure for capturing the detected torque signal and the torque detecting element 10 can advantageously be dispensed with, allowing the torque sensor 30 to be installed compactly.

Figure 20:
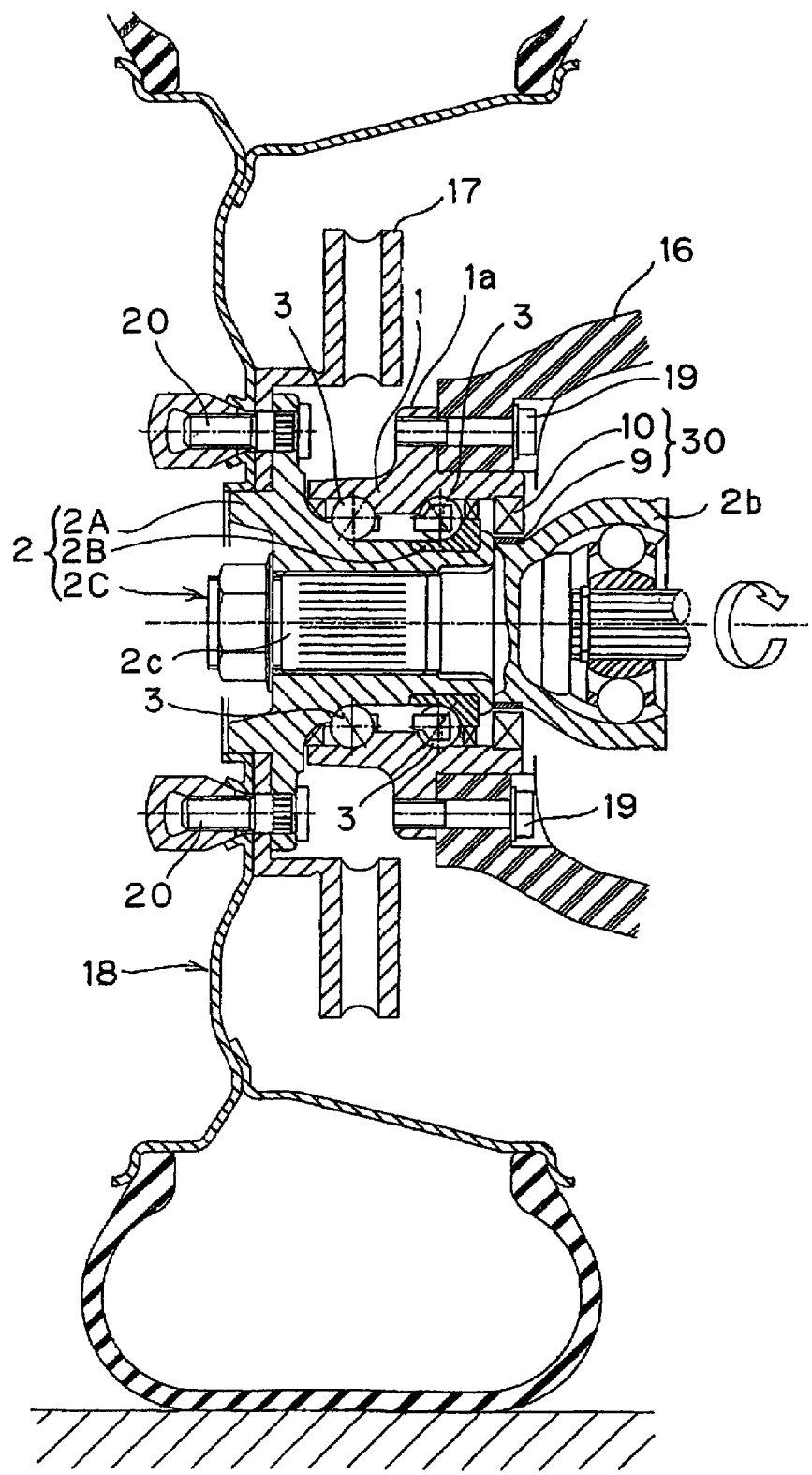
FIG. 20 is a longitudinal sectional view of the sensor-integrated wheel support bearing assembly according to a tenth preferred embodiment of the present invention, showing the support structure for supporting the vehicle drive wheel.

FIG. 20 illustrates a tenth preferred embodiment of the present invention. The sensor-integrated wheel support bearing assembly shown therein is substantially similar to that according to the ninth embodiment shown in FIG. 14, but differs therefrom in that in this embodiment, the to-be-detected element 9 is disposed on an outer periphery of a constant velocity universal joint outer race 2C forming a part of the inner member 2. The torque detecting element 10 is disposed in an inner peripheral surface of the outer member 1 so as to encircle the to-be-detected element 9 while facing an outer peripheral surface of the to-be-detected element 9. Other structural features of the wheel support bearing assembly shown in FIG. 20 are substantially similar to those shown and described in connection with the ninth embodiment of the present invention.

In the tenth embodiment, since a relatively large space for installation of the to-be-detected element 9 and the torque detecting element 10 disposed so as to confront the to-be-detected element 9 can be secured, the torque detecting element 10 can be disposed in the wheel support bearing assembly compactly, without the size of the wheel support bearing assembly being increased.

Figure 21:
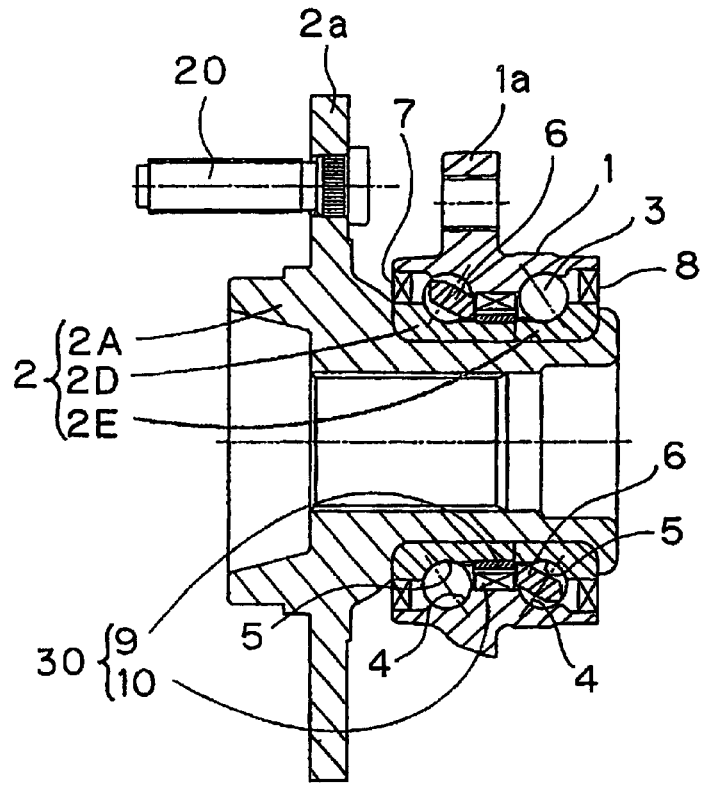
FIG. 21 is a longitudinal sectional view of the sensor-integrated wheel support bearing assembly according to an eleventh preferred embodiment of the present invention.

FIG. 21 illustrates an eleventh preferred embodiment of the present invention. The sensor-integrated wheel support bearing assembly shown therein is a 2.5 generation type wheel support bearing assembly of an inner race rotating model that is used to rotatably support a vehicle drive wheel. In this case, the inner member 2 is made up of a hub axle 2A, a pair of split type inner races 2D and 2E mounted on an outer periphery of an axle portion of the hub axle 2A, and a constant velocity universal joint outer race (not shown) that is inserted into the axial bore of the hub axle 2A. The constant velocity universal joint outer race is identical to the constant velocity universal joint outer race 2C employed in the ninth embodiment. The raceway surfaces 5 and 5 are, in this case, formed on respective outer peripheral surfaces of the inner races 2D and 2E. Other structural features of the wheel support bearing assembly shown in FIG. 21 are similar to those of the ninth embodiment.

Figure 22:
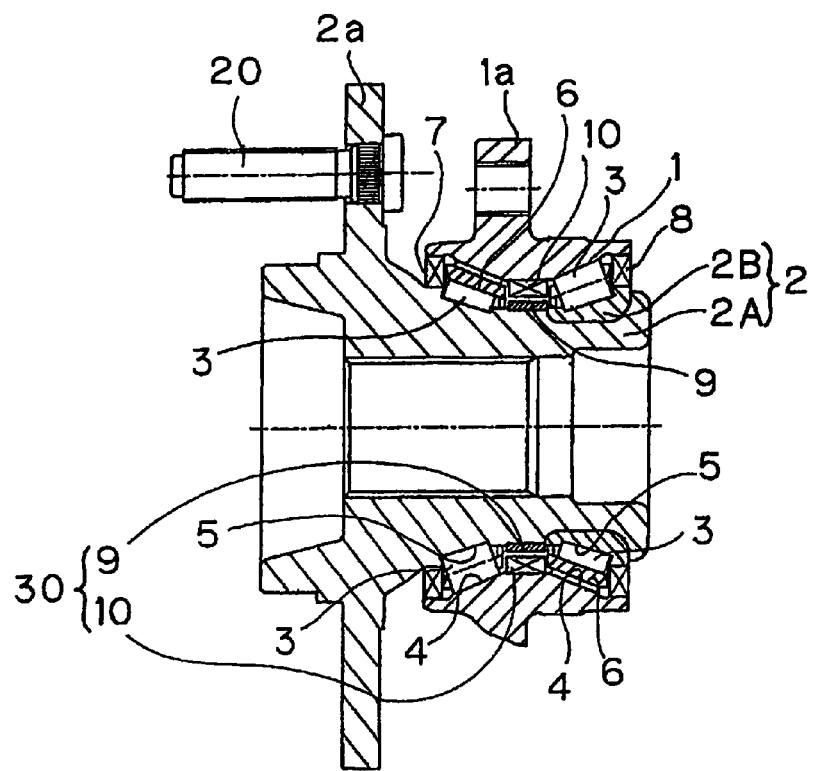
FIG. 22 is a longitudinal sectional view of the sensor-integrated wheel support bearing assembly according to a twelfth preferred embodiment of the present invention.

FIG. 22 is a twelfth preferred embodiment of the present invention. The sensor-equipped wheel support bearing assembly shown therein is a third generation type wheel support bearing assembly of an inner race rotating model that is used to rotatably support the vehicle drive wheel. The wheel support bearing assembly shown in FIG. 22 differs from that of the ninth embodiment in that in this embodiment, instead of the rolling balls, tapered rollers are employed for the rolling elements 3. Other structural features of the wheel support bearing assembly shown in FIG. 22 are similar to those shown and described in connection with the ninth embodiment.

Figure 23:
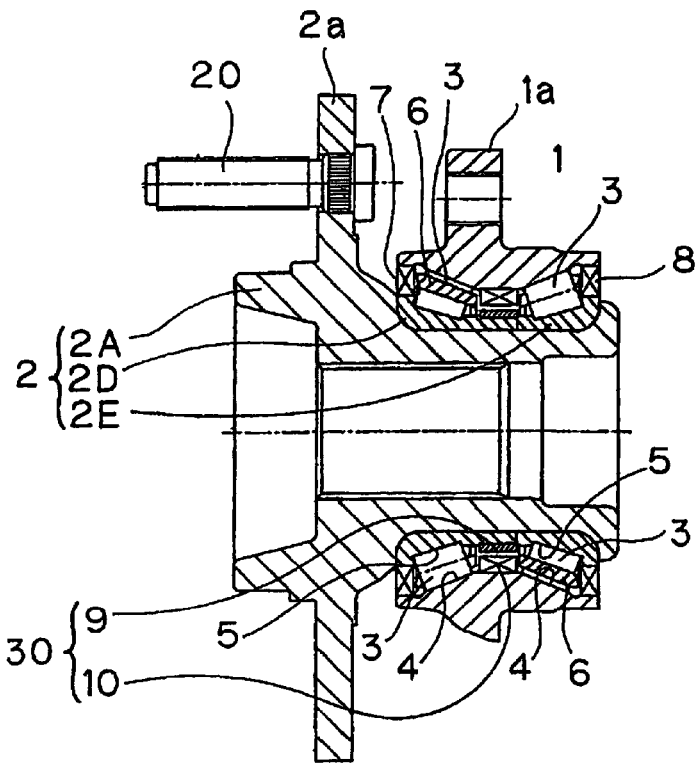
FIG. 23 is a longitudinal sectional view of the sensor-integrated wheel support bearing assembly according to a thirteenth preferred embodiment of the present invention.

FIG. 23 illustrates a thirteenth preferred embodiment of the present invention. The sensor-integrated wheel support bearing assembly shown therein is a 2.5 generation type wheel support bearing assembly of an inner race rotating type that is used to rotatably support a vehicle drive wheel. This wheel support bearing assembly differs from that of the twelfth embodiment shown in FIG. 22, in that in this embodiment, the inner member 2 is made up of a hub axle 2A, a pair of split type inner races 2D and 2E mounted on an outer periphery of an axle portion of the hub axle 2A, and a constant velocity universal joint outer race (not shown) that is inserted into the axial bore of the hub axle 2A. The constant velocity universal joint outer race is identical to the constant velocity universal joint outer race 2C employed in the ninth embodiment. The raceway surfaces 5 and 5 are, in this case, formed on respective outer peripheral surfaces of the inner races 2D and 2E. Other structural features of the wheel support bearing assembly shown in FIG. 23 are similar to those employed in the twelfth embodiment of FIG. 22.

Figure 24:
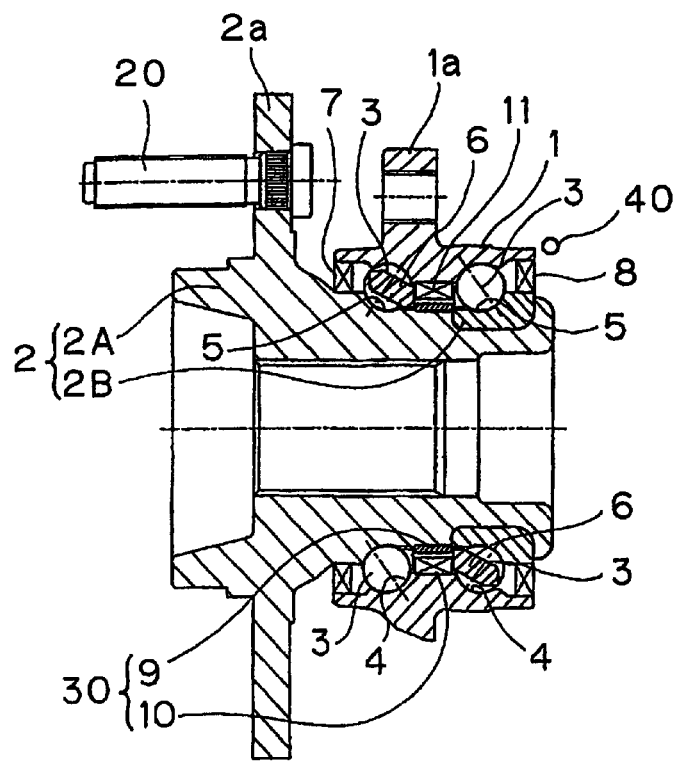
FIG. 24 is a longitudinal sectional view of the sensor-integrated wheel support bearing assembly according to a fourteenth preferred embodiment of the present invention.

It is to be noted that in describing each of the ninth to thirteenth embodiments, only the torque sensors 30 has been described as provided in the wheel support bearing assembly. However, the present invention is not limited thereto, and another sensor 40 other than the torque sensor 30 may be employed in the wheel support bearing assembly as shown in FIG. 24. Other structural features of the example shown in FIG. 24 are substantially similar to those employed in the ninth embodiment of FIG. 15. The sensor 40 may be one of a rotation detecting sensor for detecting the rotational speed of the inner member 2, a load sensor for detecting the load imposed on the inner member 2, and a temperature sensor for detecting the temperature of the wheel support bearing assembly. Also, a combination of those sensors can be employed in the bearing assembly of FIG. 24.

By so doing, not only the torque acting on the shaft or axle, but also one or a combination of the rotational speed, the load and the temperature can be detected from the wheel support bearing assembly and, therefore, a high level control of the attitude assumed by the automotive vehicle during the travel thereof or transmission of abnormality warning signals can be accomplished. Since those plural functionalities are incorporated in the single bearing assembly, a plurality of sensors does not require individual spaces for installation and can advantageously be facilitated.

It is also to be noted that although in any one of the ninth to thirteenth embodiments, the inner member has been shown and described as forming the rotatable member, the present invention can be equally applied to the wheel support bearing assembly, in which the outer member is a rotatable member. In such case, the outer member is provided with the to-be-detected element made of the magnetostrictive material and the inner member is provided with the torque detecting element.

What is claimed is:

1. A sensor-integrated wheel support bearing assembly for rotatably supporting a vehicle wheel relative to a vehicle body structure, which assembly comprises:
an outer member having an inner peripheral surface formed with a plurality of raceway surfaces;
an inner member having an outer peripheral surface formed with raceway surfaces in alignment with the raceway surfaces in the outer member;
a plurality of rows of rolling elements interposed between the raceway surfaces in the outer member and the raceway surfaces in the inner member, respectively; and
a load sensor,
wherein the load sensor is disposed in one of the outer and inner members, which forms a stationary member,
wherein the outer member has an outer periphery formed with a vehicle body fitting flange, and
wherein the load sensor for detecting a load acting on the vehicle wheel by detection of a load acting on the vehicle body fitting flange is disposed in the vehicle body fitting flange.

2. The sensor-integrated wheel support bearing assembly as claimed in claim 1, wherein the load sensor makes use of a magnetostrictive element or a piezoelectric element as a load detecting element having an electrical characteristic variable in dependence on the load.

3. The sensor-integrated wheel support bearing assembly as claimed in claim 1, wherein the vehicle body fitting flange has a bolt insertion hole, and wherein the load sensor is disposed in the bolt insertion hole.

4. The sensor-integrated wheel support bearing assembly as claimed in claim 3, wherein the load sensor includes a load detecting element having an electrical characteristic variable in dependence on the load, which load detecting element is provided in a bolt that is inserted into the bolt insertion hole.

5. The sensor-integrated wheel support bearing assembly as claimed in claim 3, wherein the single load sensor is employed and further comprising a processing unit for detecting a magnitude of the load based on a detection signal outputted from the load sensor.

6. The sensor-integrated wheel support bearing assembly as claimed in claim 3, wherein a plurality of the load sensors are installed in a plurality of the bolt insertion holes defined in the vehicle body fitting flange, and further comprising a processing unit for detecting a magnitude of the load and a direction of the load based on detection signals outputted respectively from the plural load sensors.

7. The sensor-integrated wheel support bearing assembly as claimed in claim 1, wherein the load sensor is so disposed as to allow the load detecting element, having its electrical characteristic variable in dependence on the load, to receive an initial preload.

8. The sensor-integrated wheel support bearing assembly as claimed in claim 1, further comprising a transmitter for transmitting wireless a detected load signal outputted from the load sensor.

9. The sensor-integrated wheel support bearing assembly as claimed in claim 1, further comprising:
a torque sensor,
wherein the torque sensor includes a to-be-detected element disposed in one of the outer and inner members, which forms a rotatable member, and made of a magnetostrictive material, and a torque detecting element provided in the other of the outer and inner members, which forms a stationary member, for detecting a change in magnetic characteristic of the to-be-detected element to detect a working torque, and
wherein the inner member is the rotatable member and includes an outer race of a constant velocity universal joint and wherein the to-be-detected element is provided on an outer periphery of the outer race of the constant velocity universal joint.

10. A sensor-integrated wheel support bearing assembly for rotatably supporting a vehicle wheel relative to a vehicle body structure, which assembly comprises:
an outer member having an inner peripheral surface formed with a plurality of raceway surfaces;
an inner member having an outer peripheral surface formed with raceway surfaces in alignment with the raceway surfaces in the outer member;
a plurality of rows of rolling elements interposed between the raceway surfaces in the outer member and the raceway surfaces in the inner member, respectively; and
and a torque sensor,
wherein the torque sensor includes a to-be-detected element disposed in one of the outer and inner members, which forms a rotatable member, and made of a magnetostrictive material, and a torque detecting element provided in the other of the outer and inner members, which forms a stationary member, for detecting a change in magnetic characteristic of the to-be-detected element to detect a working torque, and
wherein the to-be-detected element is positioned intermediate between the raceway surfaces.

11. The sensor-integrated wheel support bearing assembly as claimed in claim 10, wherein the magnetostrictive material for the to-be-detected element is an alloy of iron and aluminum and wherein the torque detecting element is a coil so provided on the outer member as to encircle the to-be-detected element.

12. The sensor-integrated wheel support bearing assembly as claimed in claim 10, wherein the to-be-detected element includes a hollow cylindrical body made of a magnetostrictive material and having a plurality of inclined grooves defined therein in a circular row in a direction circumferentially of the cylindrical body, which grooves are inclined relative to an axial direction of the bearing assembly.

13. The sensor-integrated wheel support bearing assembly as claimed in claim 12, wherein the inclined grooves are formed in two circular rows extending in the direction circumferentially of the cylindrical body, inclination directions of the grooves of those two circular rows being opposite to each other.

14. The sensor-integrated wheel support bearing assembly as claimed in claim 12, wherein each of the inclined grooves has a depth equal to or greater than 0.1 mm.

15. The sensor-integrated wheel support bearing assembly as claimed in claim 10, further comprising a transmitter for transmitting wireless a detection signal fed from the torque detecting element.

16. The sensor-integrated wheel support bearing assembly as claimed in claim 10, comprising at least one of a rotation detecting sensor for detecting a rotational speed of the inner member, a load sensor for detecting a load acting on the inner member and a temperature sensor for detecting a temperature of the wheel support bearing assembly.

* * * * *